US012588052B2

(12) United States Patent
Shafin et al.

(10) Patent No.: US 12,588,052 B2
(45) Date of Patent: Mar. 24, 2026

(54) QoS SUPPORT FOR P2P COMMUNICATION

(71) Applicant: Samsung Electronics Co., Ltd.,
Suwon-si (KR)

(72) Inventors: Rubayet Shafin, Allen, TX (US); Boon Loong Ng, Plano, TX (US)

(73) Assignee: Samsung Electronics Co., Ltd.,
Suwon-si (KR)

( * ) Notice: Subject to any disclaimer, the term of this patent is extended or adjusted under 35 U.S.C. 154(b) by 386 days.

(21) Appl. No.: 18/318,634

(22) Filed: May 16, 2023

(65) Prior Publication Data

US 2023/0389064 A1    Nov. 30, 2023

Related U.S. Application Data

(60) Provisional application No. 63/394,880, filed on Aug. 3, 2022, provisional application No. 63/346,190, filed on May 26, 2022.

(51) Int. Cl.
*H04W 72/543*       (2023.01)
*H04W 72/50*        (2023.01)
*H04W 76/15*        (2018.01)

(52) U.S. Cl.
CPC ....... *H04W 72/543* (2023.01); *H04W 72/535* (2023.01); *H04W 76/15* (2018.02)

(58) Field of Classification Search
CPC .. H04W 72/543; H04W 76/15; H04W 72/535
See application file for complete search history.

(56) References Cited

U.S. PATENT DOCUMENTS

2021/0378039 A1    12/2021    Cherian et al.
2022/0053560 A1*    2/2022    Xin ................... H04W 74/0816
2023/0047705 A1*    2/2023    Xin ................... H04W 74/0808
2023/0058871 A1*    2/2023    Xin ................... H04W 74/0816
(Continued)

FOREIGN PATENT DOCUMENTS

WO        2021215753 A1    10/2021
WO        2022005165 A1     1/2022
WO        2022056009 A1     3/2022

OTHER PUBLICATIONS

IEEE P802.11be-D1.5; Draft Standard for Information technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)" Mar. 2022, 831 pages.
(Continued)

*Primary Examiner* — Ajay Cattungal

(57)        ABSTRACT
Methods and apparatuses for supporting QoS support for P2P communication. A method for wireless communication performed by a non-access point (AP) device that includes a first station (STA) comprises: forming a link with a first AP; forming a first peer-to-peer (P2P) link with a second non-AP STA; transmitting a request associated with a transmit opportunity (TXOP) to the AP; receiving information associated with the TXOP from the AP; and determining whether the received information associated with the TXOP can be used only for uplink communication or for both uplink communication and P2P communication.

20 Claims, 22 Drawing Sheets

(56) References Cited

U.S. PATENT DOCUMENTS

| | | | | |
|---|---|---|---|---|
| 2023/0104446 A1* | 4/2023 | Ajami | | H04W 74/0808 |
| | | | | 370/329 |
| 2023/0137826 A1* | 5/2023 | Ajami | | H04L 5/0055 |
| | | | | 370/329 |
| 2023/0180047 A1* | 6/2023 | Ajami | | H04W 52/0216 |
| | | | | 370/230 |
| 2023/0180314 A1* | 6/2023 | Kim | | H04L 1/0001 |
| 2023/0247666 A1 | 8/2023 | Kim et al. | | |
| 2024/0049304 A1* | 2/2024 | Ko | | H04W 74/06 |
| 2024/0090034 A1* | 3/2024 | Kim | | H04W 74/0866 |
| 2024/0155717 A1* | 5/2024 | Huang | | H04W 24/10 |
| 2024/0260070 A1* | 8/2024 | Jang | | H04W 74/0808 |
| 2025/0056614 A1* | 2/2025 | Quan | | H04W 8/22 |
| 2025/0142396 A1* | 5/2025 | Ajami | | H04W 72/21 |

OTHER PUBLICATIONS

IEEE P802.11be-D3.0; Draft Standard for Information technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)" Jan. 2023, 999 pages.

IEEE P802.11-REVme™/D2.1; Draft Standard for Information Technology—Telecommunications and Information exchange between Systems Local and Metropolitan Area Networks—Specific Requirements; "Part 11: Wireless LAN Medium Access Control (MAC) and Physical Layer (PHY) Specifications," Jan. 2023, 5803 pages.

Extended European Search Report issued Mar. 27, 2025 regarding Application No. 23812108.1, 13 pages.

Li et al., "CC36 comment resolution: P2P Buffer report", IEEE Draft, 11-22-0763-00-00BE, May 2022, 7 pages.

IEEE P802.11be ™/ D2.0 "Part 11: Wireless LAN Medium Access Control (MAC) and Physical Layer (PHY) Specifications; Amendment 8: Enhancements for extremely high throughput (EHT)" May 2022, 873 pages.

International Search Report and Written Opinion issued Aug. 21, 2023 regarding International Application No. PCT/KR2023/006982, 7 pages.

Haider et al., "p2p Support in Restricted TWT: Use Cases and Signaling Design Discussion", IEEE802.11-21/1855r0, Nov. 2021, 9 pages.

Yang et al., "TXOP Sharing for use in MU P2P", IEEE 802.11-20/1938r8, Jun. 2021, 8 pages.

Hwang et al., "Multi-user Triggered P2P Transmission", IEEE 802.11-20/0967r0, Jul. 2020, 10 pages.

* cited by examiner

500

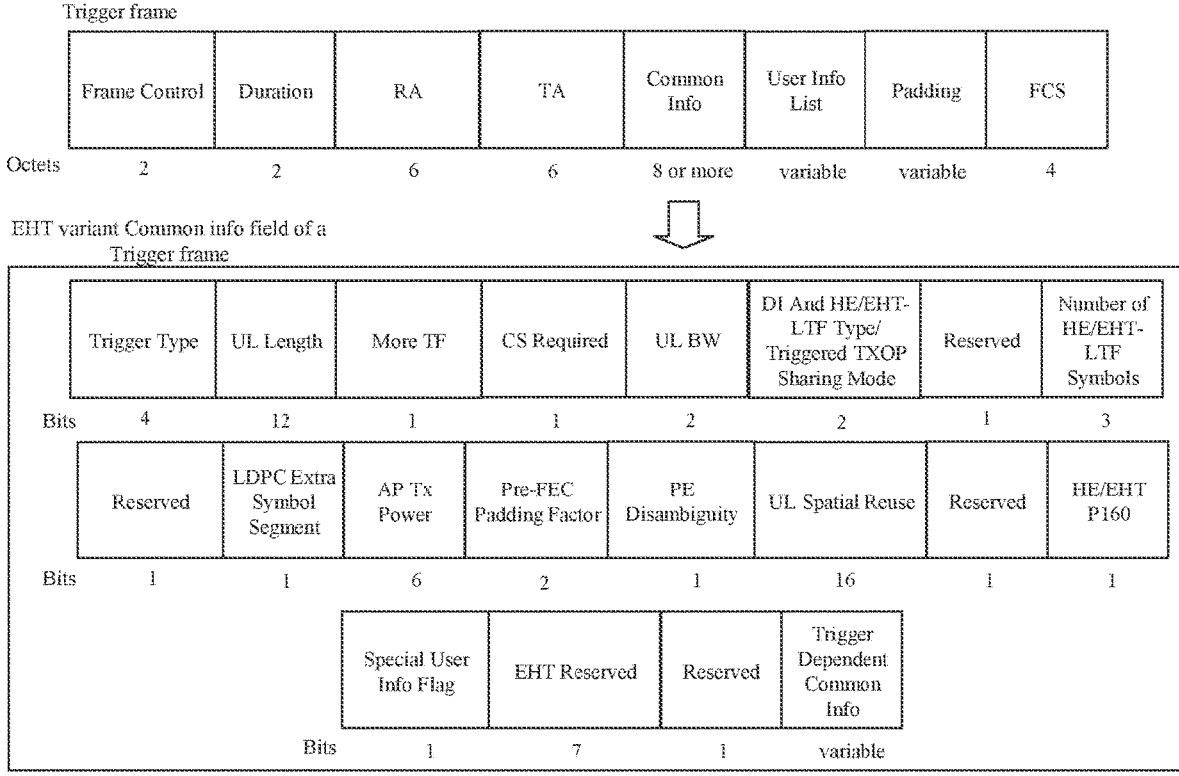

Trigger frame

| Frame Control | Duration | RA | TA | Common Info | User Info List | Padding | FCS |
|---|---|---|---|---|---|---|---|
| 2 | 2 | 6 | 6 | 8 or more | variable | variable | 4 |

Octets

EHT variant Common info field of a
Trigger frame

| Trigger Type | UL Length | More TF | CS Required | UL BW | DI And HE/EHT-LTF Type/ Triggered TXOP Sharing Mode | Reserved | Number of HE/EHT-LTF Symbols |
|---|---|---|---|---|---|---|---|
| 4 | 12 | 1 | 1 | 2 | 2 | 1 | 3 |

Bits

| Reserved | LDPC Extra Symbol Segment | AP Tx Power | Pre-FEC Padding Factor | PE Disambiguity | UL Spatial Reuse | Reserved | HE/EHT P160 |
|---|---|---|---|---|---|---|---|
| 1 | 1 | 6 | 2 | 1 | 16 | 1 | 1 |

Bits

| Special User Info Flag | EHT Reserved | Reserved | Trigger Dependent Common Info |
|---|---|---|---|
| 1 | 7 | 1 | variable |

Bits

FIG. 5

| Frame Control | Duration | RA | TA | TXS Request Information | FCS |
|---|---|---|---|---|---|
Octets        2          2          6          6          3          4
FIG. 7
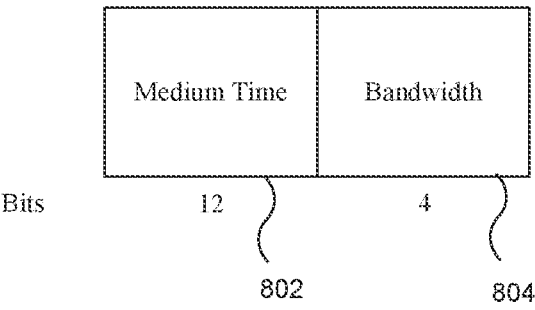
| Medium Time | Bandwidth |
|---|---|
Bits            12            4
              802           804
FIG. 8

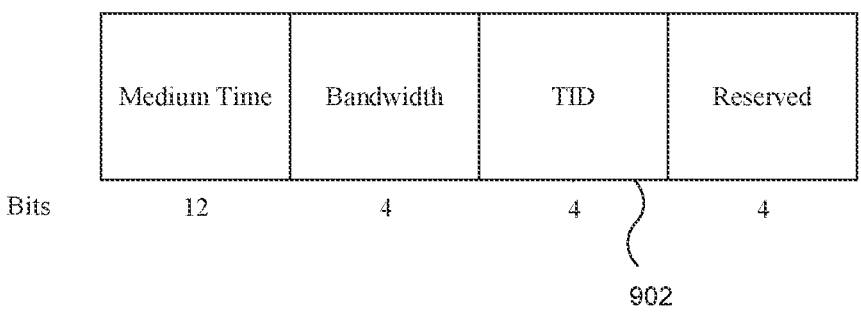
FIG. 9
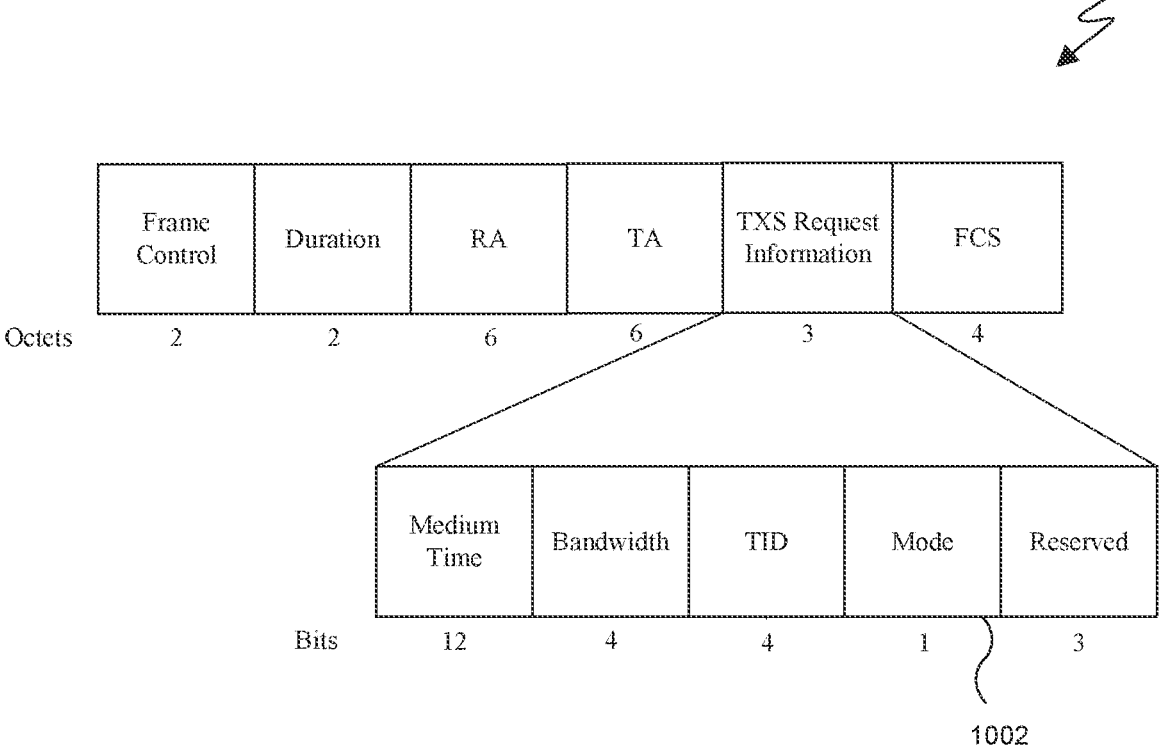
FIG. 10

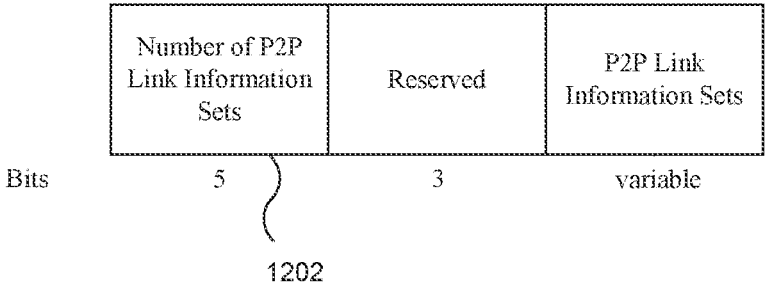
| Number of P2P Link Information Sets | Reserved | P2P Link Information Sets |
|---|---|---|
| 5 | 3 | variable |
Bits
1202
FIG. 12
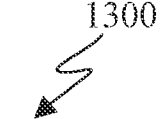
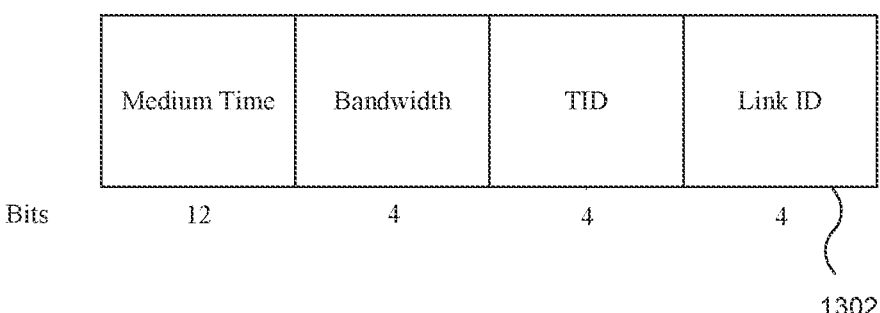
| Medium Time | Bandwidth | TID | Link ID |
|---|---|---|---|
| 12 | 4 | 4 | 4 |
Bits
1302
FIG. 13

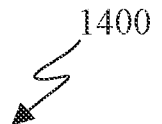
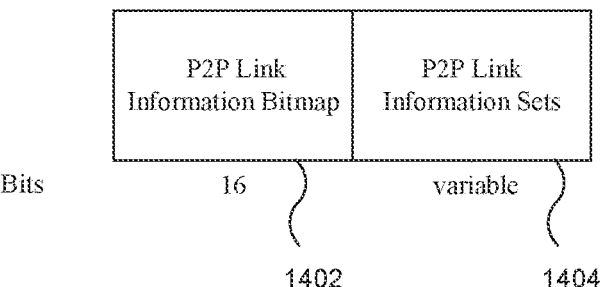
Bits              16              variable
1402                          1404
FIG. 14

1700

| Frame Control | Duration | RA | TA | TXS Request Information | QoS Characteristics | FCS |
|---|---|---|---|---|---|---|
| 2 | 2 | 6 | 6 | 3 | variable | 4 |

Octets

1702

1900

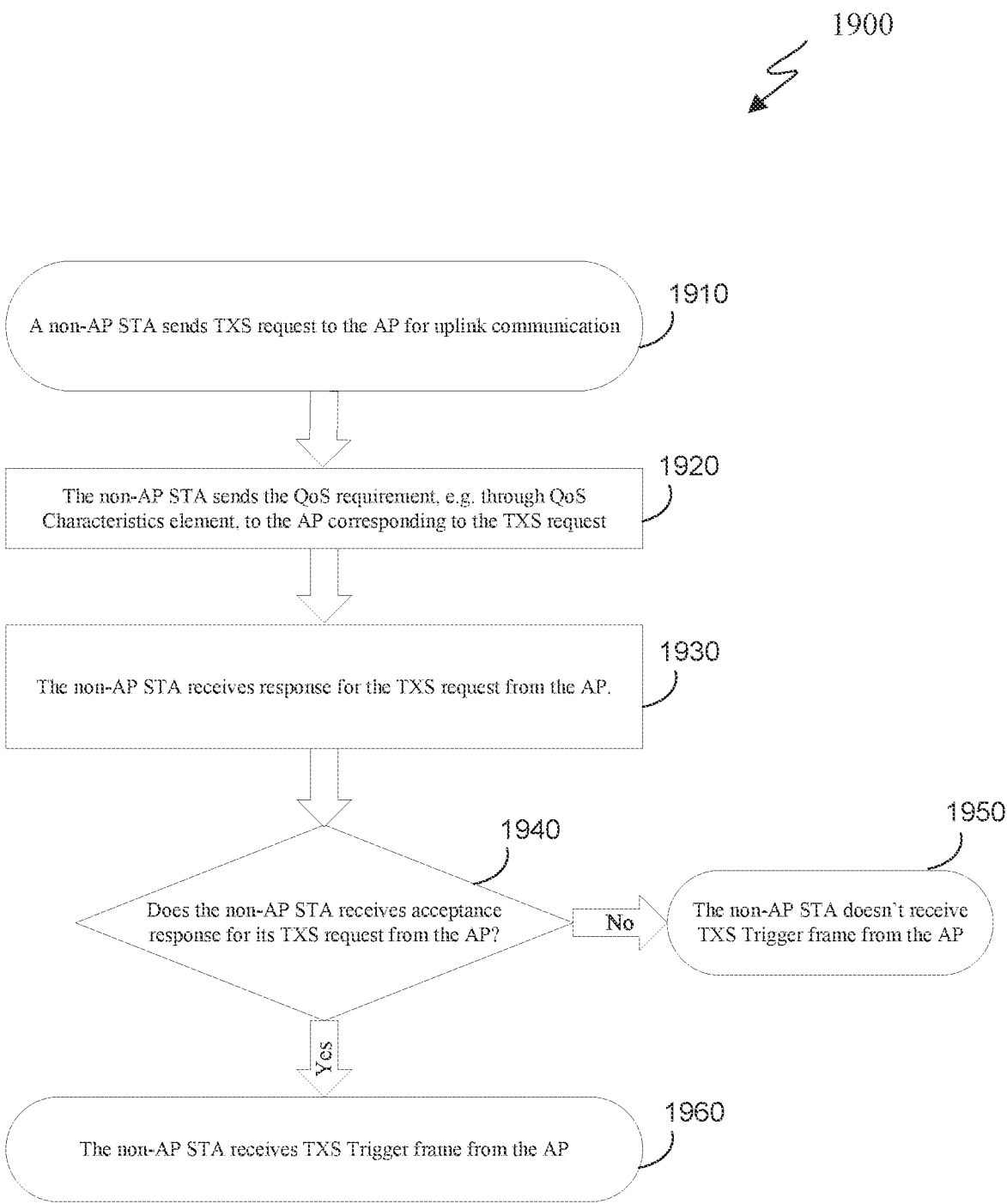

A non-AP STA sends TXS request to the AP for uplink communication ⟶ 1910

The non-AP STA sends the QoS requirement, e.g. through QoS Characteristics element, to the AP corresponding to the TXS request ⟶ 1920

The non-AP STA receives response for the TXS request from the AP. ⟶ 1930

Does the non-AP STA receives acceptance response for its TXS request from the AP? ⟶ 1940

No ⟶ The non-AP STA doesn't receive TXS Trigger frame from the AP ⟶ 1950

Yes

The non-AP STA receives TXS Trigger frame from the AP ⟶ 1960

A non-AP STA has packets in the queue for its peer STA

2020

The non-AP STA sends Peer-to-Peer BSR to the AP indicating its buffer status corresponding to it P2P traffic

2030

The non-AP STA receives MU-RTS TXS Trigger frame (Mode-2 ) from the AP for enabling its P2P traffic.

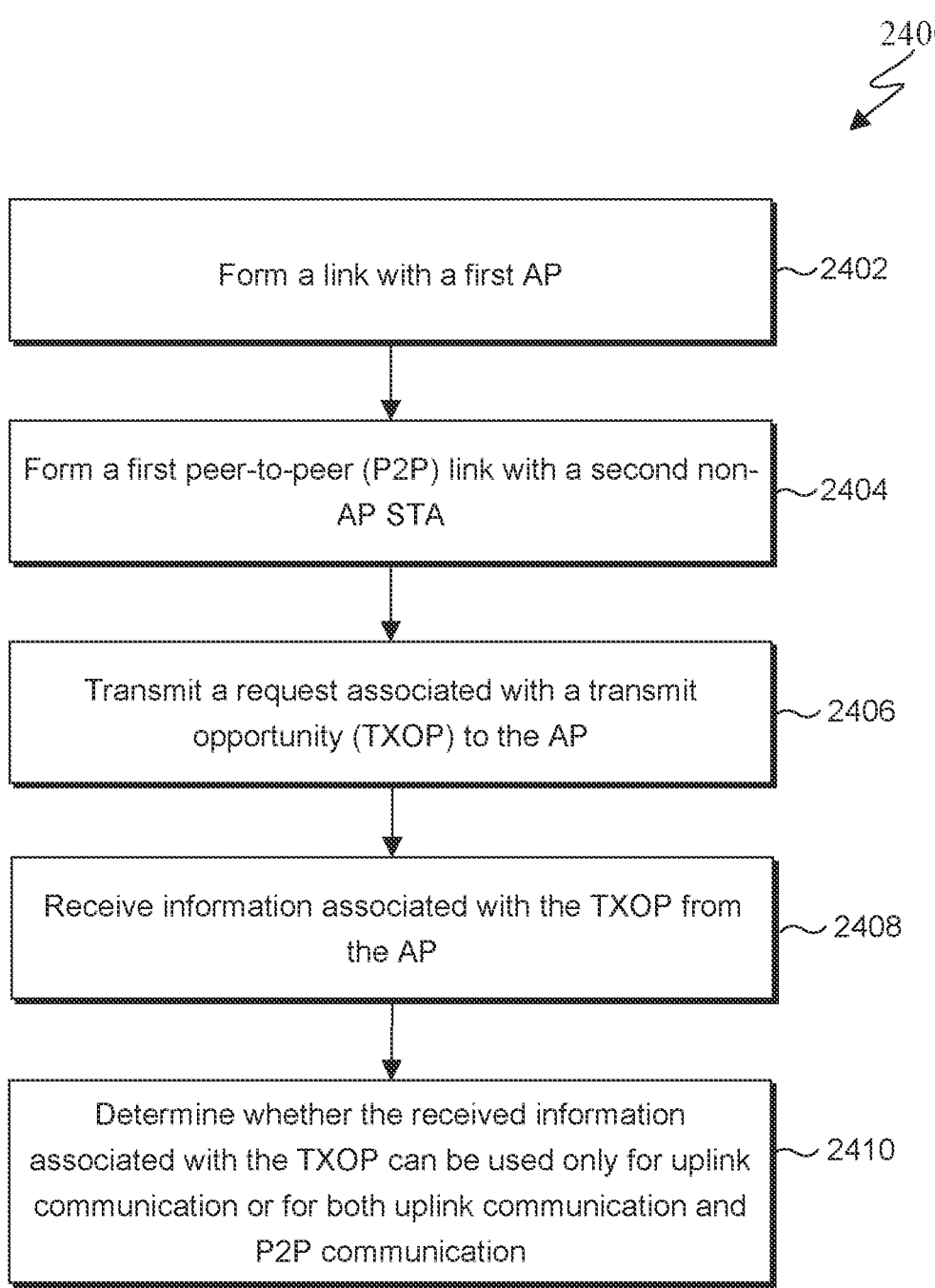

2400

Form a link with a first AP — 2402

Form a first peer-to-peer (P2P) link with a second non-AP STA — 2404

Transmit a request associated with a transmit opportunity (TXOP) to the AP — 2406

Receive information associated with the TXOP from the AP — 2408

Determine whether the received information associated with the TXOP can be used only for uplink communication or for both uplink communication and P2P communication — 2410

FIG.24

QoS SUPPORT FOR P2P COMMUNICATION

CROSS-REFERENCE TO RELATED APPLICATION AND CLAIM OF PRIORITY

This application claims priority under 35 U.S.C. § 119(e) to U.S. Provisional Patent Application No. 63/346,190 filed on May 26, 2022, and U.S. Provisional Patent Application No. 63/394,880 filed on Aug. 3, 2022, which is hereby incorporated by reference in its entirety.

TECHNICAL FIELD

This disclosure relates generally to transmission efficiency in wireless communications systems that include multi-link devices. Embodiments of this disclosure relate to methods and apparatuses for quality of service (QoS) support for peer-to-peer (P2P) communication.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for QoS support for P2P communication.

In one embodiment, a non-AP device is provided, comprising: a first station (STA) comprising a transceiver configured to: form a link with a first AP, form a first peer-to-peer (P2P) link with a second non-AP STA, transmit a request associated with a transmit opportunity (TXOP) to the AP, and receive information associated with the TXOP from the AP. The non-AP device includes a processor operably coupled to the transceiver, the processor configured to determine whether the received information associated with the TXOP can be used only for uplink communication or for both uplink communication and P2P communication.

In another embodiment, a method of wireless communication performed by a non-AP device that includes a first station STA comprises: forming a link with a first AP; forming a first peer-to-peer (P2P) link with a second non-AP STA; transmitting a request associated with a transmit opportunity (TXOP) to the AP; receiving information associated with the TXOP from the AP; and determining whether the received information associated with the TXOP can be used only for uplink communication or for both uplink communication and P2P communication.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates an example multiuser request to send (MU-RTS) TXOP sharing (TXS) trigger frame format according to embodiments of the present disclosure;

FIG. 7 illustrates an example format of a TXS request frame according to embodiments of the present disclosure;

FIG. 8 illustrates an example format of a TXS request information field in a TXS request frame according to embodiments of the present disclosure;

FIG. 9 illustrates another example format of a TXS request information field in a TXS request frame according to embodiments of the present disclosure;

FIG. 10 illustrates another example format of a TXS request information field in a TXS request frame according to embodiments of the present disclosure;

FIG. 12 illustrates another example format of a TXS request information field in a TXS request frame according to embodiments of the present disclosure;

FIG. 13 illustrates an example format of a P2P link information subfield in a P2P link information sets subfield according to embodiments of the present disclosure;

FIG. 14 illustrates another example format of a TXS request information field in a TXS request frame according to embodiments of the present disclosure;

FIG. 19 illustrates a flowchart of a method using a TXS request procedure according to embodiments of the present disclosure;

FIG. 24 illustrates a flowchart of a method for wireless communication performed by a non-AP device according to embodiments of the present disclosure.

DETAILED DESCRIPTION

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure provide mechanisms for QoS support for P2P communication.

Figure 1:
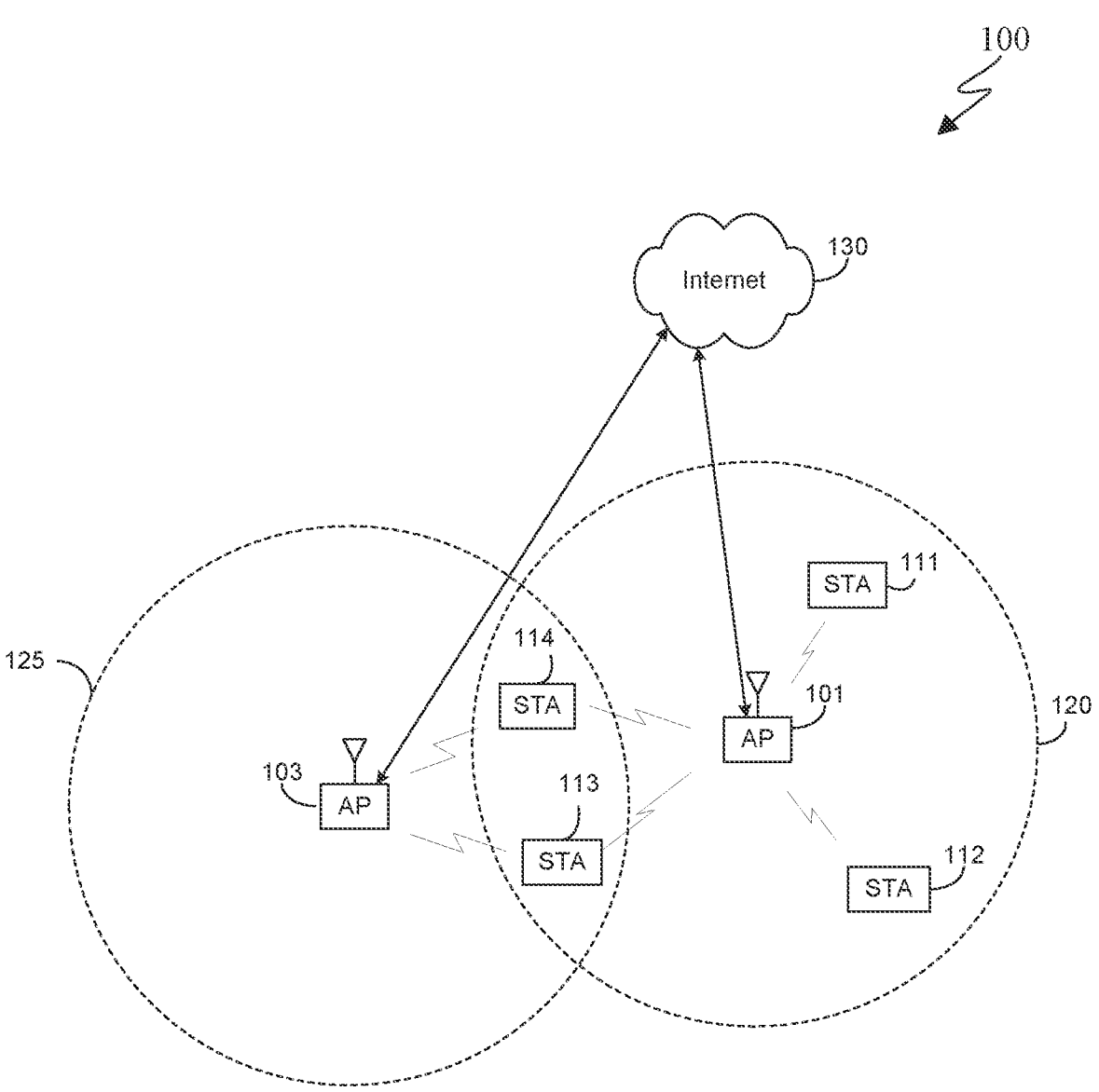
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for QoS support for P2P communication. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
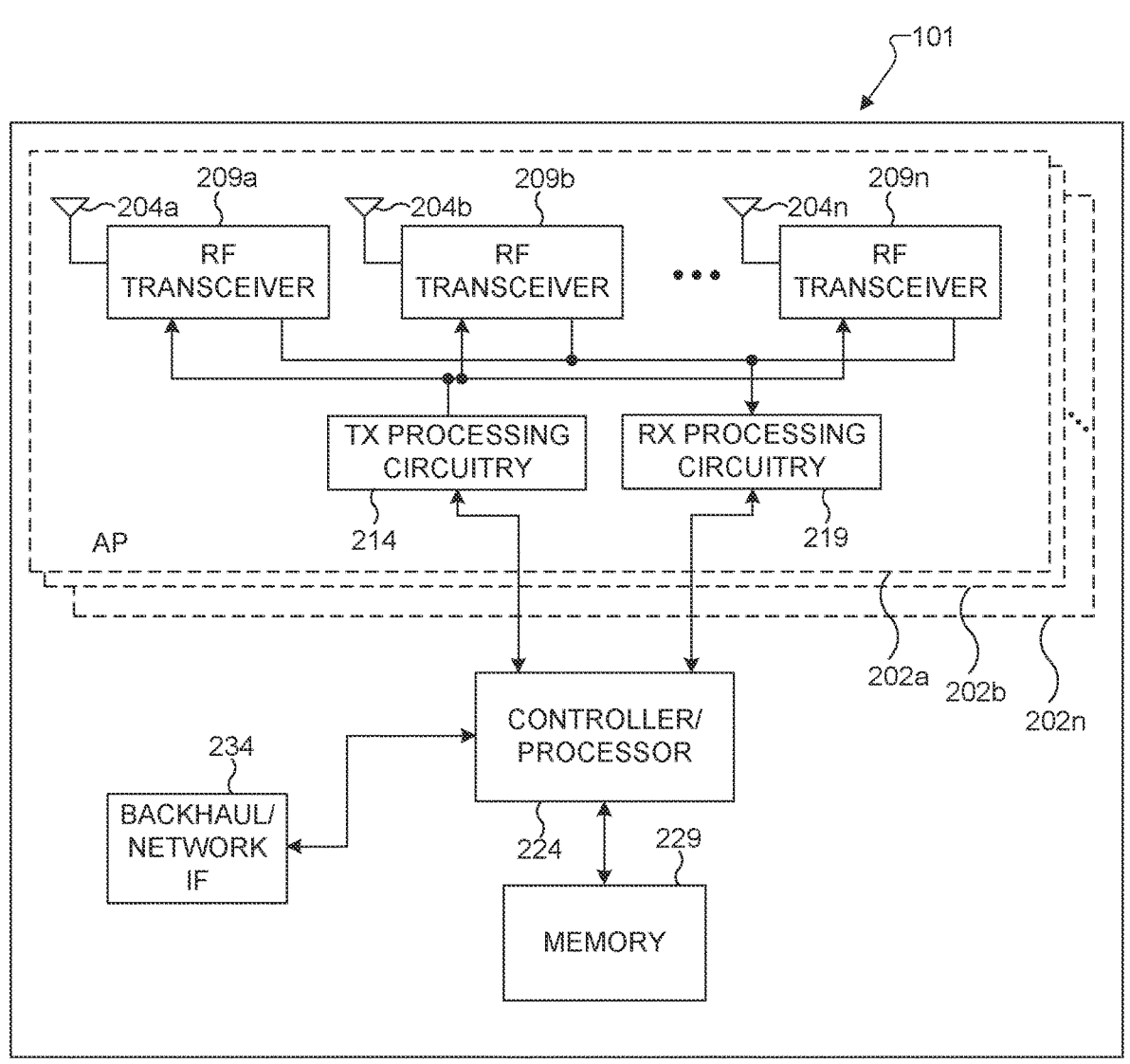
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including QoS support for P2P communication. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for QoS support for P2P communication. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
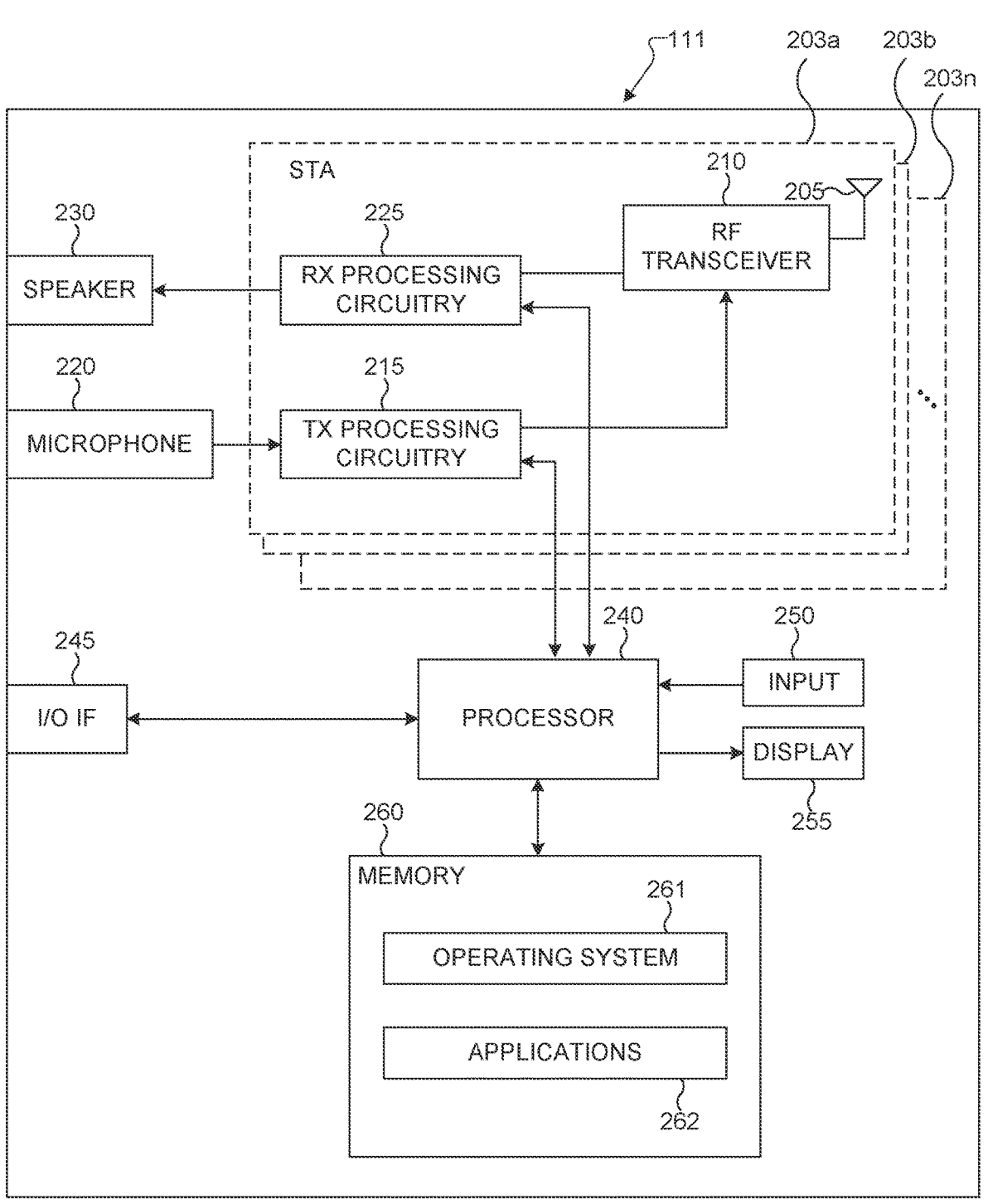
FIG. 2B illustrates an example station (STA) according to embodiments of the present disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to support QoS support for P2P communication. In some embodiments, the controller/processor 240 includes at least one microprocessor or microcontroller.

The controller/processor 240 is also capable of executing other processes and programs resident in the memory 260, such as operations for supporting QoS support for P2P communication. The controller/processor 240 can move data into or out of the memory 260 as required by an executing process. In some embodiments, the controller/processor 240 is configured to execute a plurality of applications 262, such as applications for supporting QoS support for P2P communication. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Various embodiments of the present disclosure recognize that TXOP sharing is a newly defined feature in the IEEE 802.11be spec. Using this procedure, an AP can allocate TXOP to a non-AP STA using an MU-RTS Trigger frame.

Using a TXOP sharing procedure, an AP helps a STA to win the channel so that the STA can deliver its packets. The following illustrative steps may be included in the TXOP sharing procedure:

Step-1: the AP first wins the channel; the AP obtains the TXOP for the wireless medium Step-2: the AP decides to allocate a portion of its won TXOP to a particular STA (for example STA1) in its BSS Step-3: the AP makes some indication to STA1 informing it about the allocated TXOP Step-4: STA1 utilizes the allocated TXOP for its uplink or P2P communication Step-5: after utilizing its allocated TXOP, STA1 returns the TXOP to the AP The way the AP notifies a STA about its allocated TXOP is by using the MU-RTS TXS frame, which is a newly defined trigger frame introduced in IEEE 802.11be.

Currently one MU-RTS TXS Trigger frame can allocate TXOP to a single STA only, and not more than one STA. For example:

Consider a BSS consisting of 1 AP and three STAs— STA1, STA2, and STA3.

The AP and all three STAs contend for the channel.

The AP wins the channel and obtains the TXOP for 60 ms.

The AP sends an MU-RTS TXS Trigger frame to STA1

In the trigger frame, the AP indicates that the amount of the TXOP allocated to STA1 is 20 milliseconds (ms).

After receiving the MU-RTS TXS Trigger frame from the AP, STA1 uses the allocated 20 ms of the TXOP to send uplink data to the AP.

At the end of 20 ms, the TXOP is returned to the AP.

The AP utilizes the remaining 40 ms of the TXOP to send downlink data to STA2 and STA3.

TGbe defines two TXOP sharing modes:

Mode 1: Only for UL/DL communication

In this mode, the AP allocates the TXOP to a STA and indicates to the STA that the STA can use this TXOP only to transmit uplink data packets.

Mode 2: For both UL/DL and P2P communication

In this mode, the AP allocates the TXOP to a STA and indicates to the STA that the STA can use this TXOP for both uplink communication and P2P communication.

Figure 3:
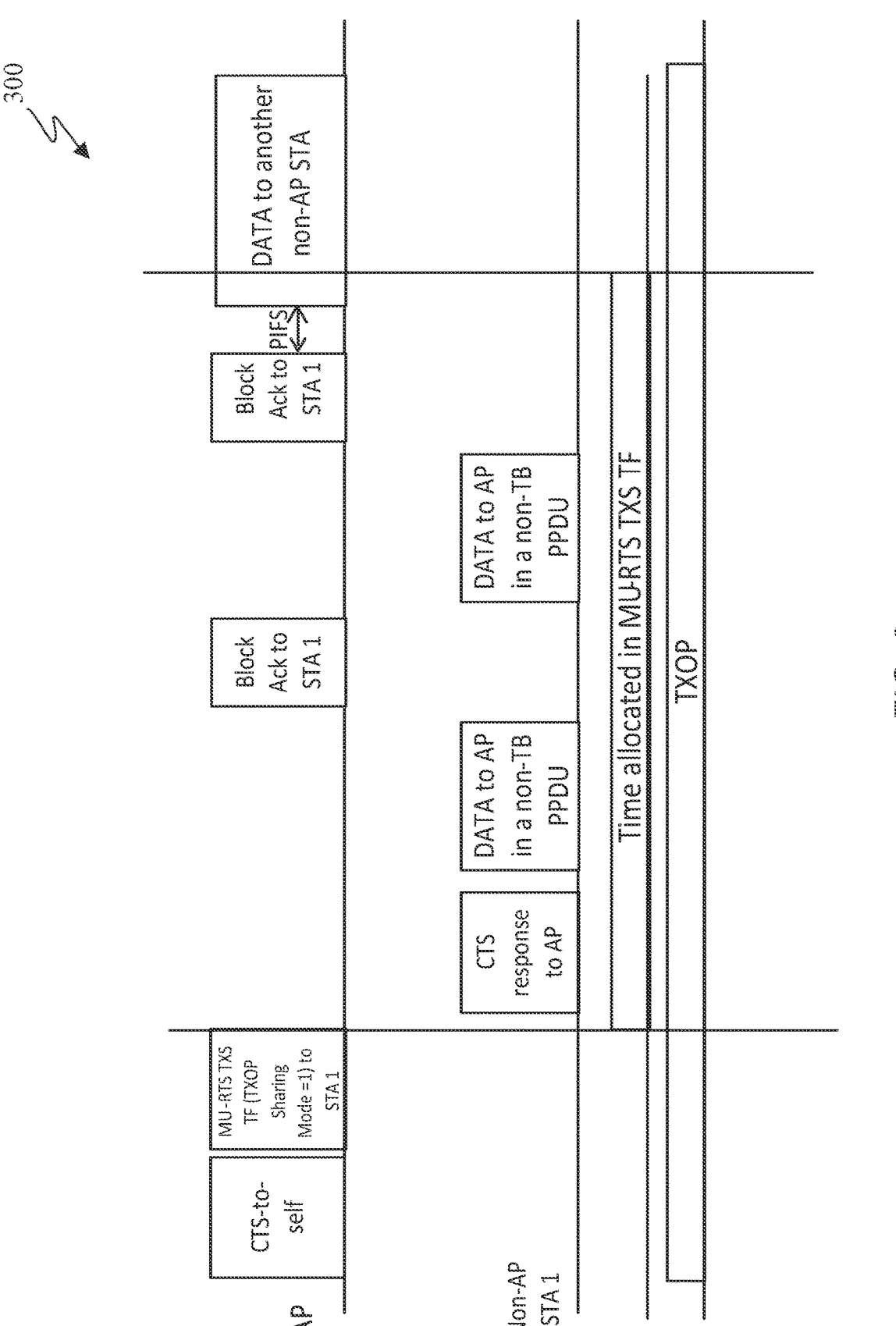
FIG. 3 illustrates an example of mode-1 transmission opportunity (TXOP) sharing where STA1 uses the TXOP only for uplink communication according to embodiments of the present disclosure.

FIG. 3 illustrates an example 300 of mode-1 transmission opportunity (TXOP) sharing where STA1 uses the TXOP only for uplink communication according to embodiments of the present disclosure. The embodiment of the example 300 of mode-1 transmission opportunity (TXOP) sharing where STA1 uses the TXOP only for uplink communication shown in FIG. 3 is for illustration only. Other embodiments of the example 300 of mode-1 transmission opportunity (TXOP) sharing where STA1 uses the TXOP only for uplink communication could be used without departing from the scope of this disclosure.

Figure 4:
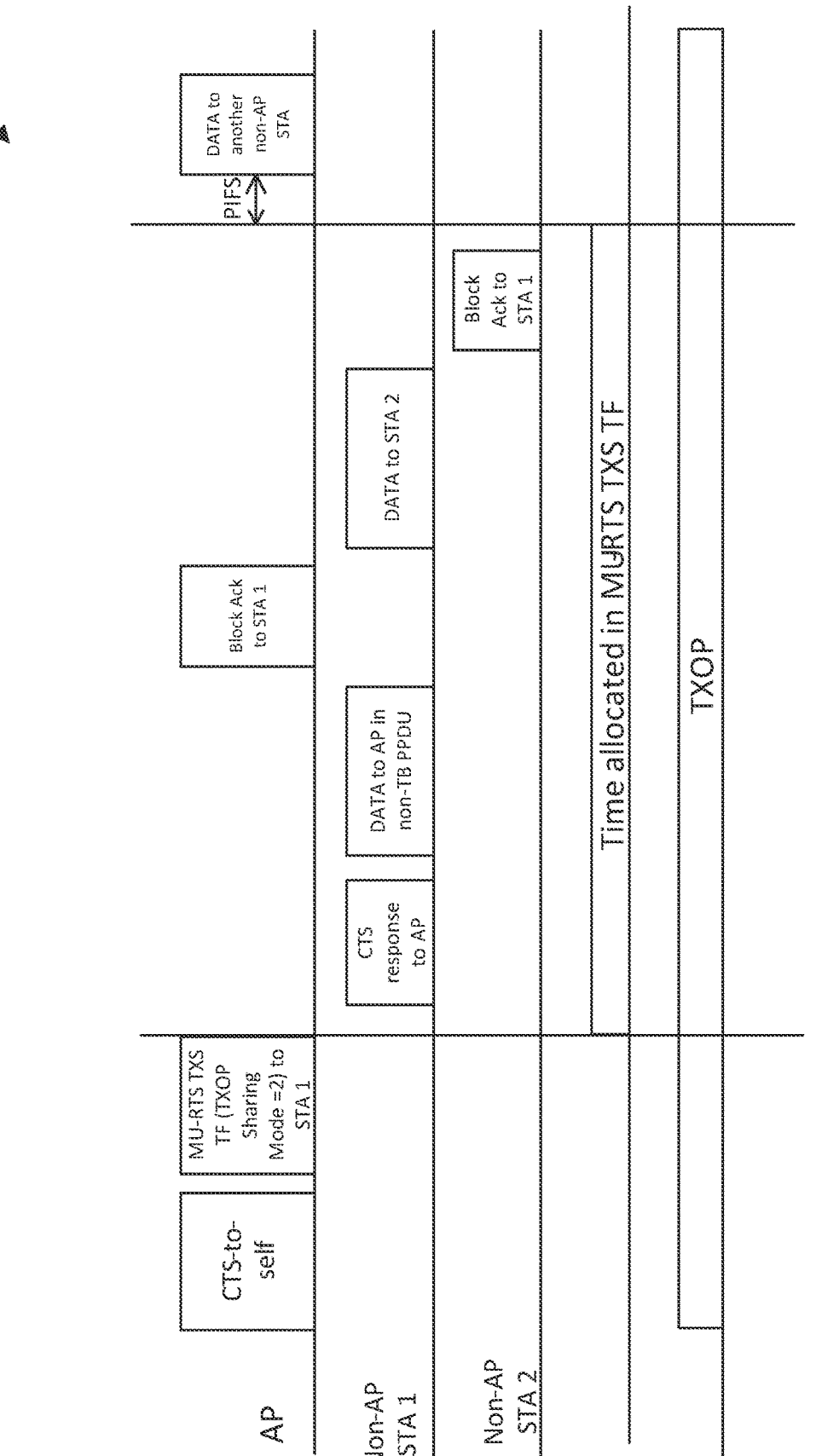
FIG. 4 illustrates an example of mode-2 TXOP sharing where STA1 uses the TXOP for both uplink communication with the AP and P2P communication with STA2 according to embodiments of the present disclosure.

FIG. 4 illustrates an example 400 of mode-2 TXOP sharing where STA1 uses the TXOP for both uplink communication with the AP and P2P communication with STA2 according to embodiments of the present disclosure. The embodiment of the example 400 of mode-2 TXOP sharing where STA1 uses the TXOP for both uplink communication with the AP and P2P communication with STA2 shown in FIG. 4 is for illustration only. Other embodiments of the example 400 of mode-2 TXOP sharing where STA1 uses the TXOP for both uplink communication with the AP and P2P communication with STA2 could be used without departing from the scope of this disclosure.

FIG. 5 illustrates an example multiuser request to send (MU-RTS) TXOP sharing (TXS) trigger frame format 500 according to embodiments of the present disclosure. The embodiment of the example multiuser request to send (MU-RTS) TXOP sharing (TXS) trigger frame format 500 shown in FIG. 5 is for illustration only. Other embodiments of the example multiuser request to send (MU-RTS) TXOP sharing (TXS) trigger frame format 500 could be used without departing from the scope of this disclosure.

As illustrated in FIG. 5, MU-RTS TXS mode is indicated in the common info field of the MU-RTS Trigger frame. In an MU-RTS Trigger frame, the duration/ID field may be set to the estimated time, in microseconds, required to transmit the pending frame(s), plus one CTS frame, plus the time to transmit the solicited HE TB PPDU if required, plus the time to transmit the acknowledgment for the solicited HE TB PPDU if required, plus applicable IFS s.

Various embodiments of the present disclosure recognize that currently there is no mechanism in the spec that enables to request for TXOP from an AP. However, such capability would be beneficial for efficient operation, especially for P2P communication.

Accordingly, various embodiments of the present disclosure provide mechanisms and frameworks for requesting TXOP from the AP or AP MLD based on dynamic changes in a non-AP STA's P2P buffer. Various embodiments of the present disclosure also provide mechanisms for Quality of Service (QoS) support for peer to peer communication.

Figure 6:
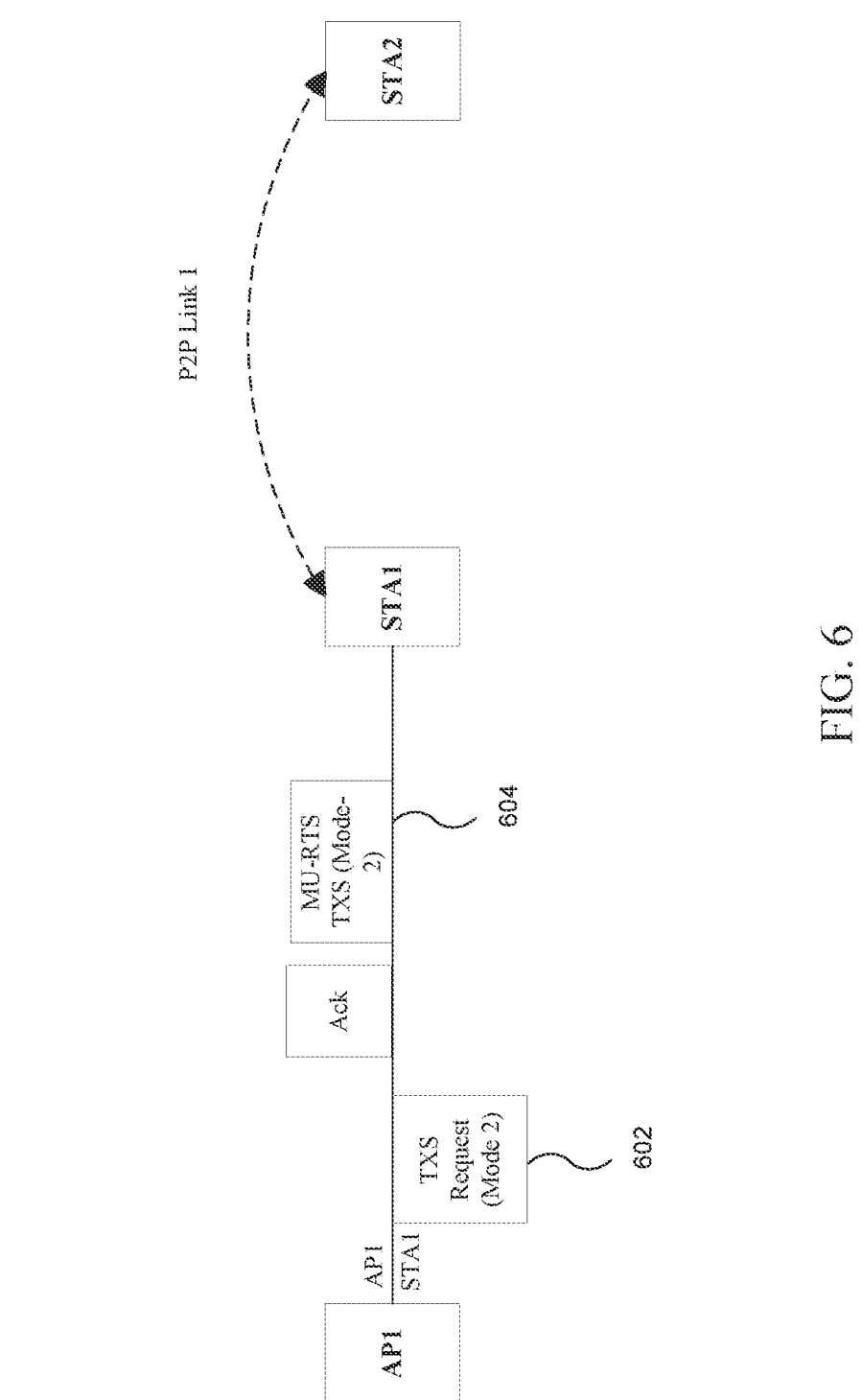
FIG. 6 illustrates an example of requesting TXOP by a peer non-AP STA according to embodiments of the present disclosure.

FIG. 6 illustrates an example 600 of requesting TXOP by a peer non-AP STA according to embodiments of the present disclosure. The embodiment of the example 600 of requesting TXOP by a peer non-AP STA shown in FIG. 6 is for illustration only. Other embodiments of the example 600 of requesting TXOP by a peer non-AP STA could be used without departing from the scope of this disclosure.

According to one embodiment, a first non-AP STA that has established a peer-to-peer (P2P) link with a second peer non-AP STA can request to the AP for allocating a transmit opportunity (TXOP) to the first STA for enabling the first STA's P2P transmission. According to one embodiment, the first STA can send a TXS Request frame 602 to the AP in order to request an MU-RTS TXS (mode-2) Trigger frame 604 for transmitting the first STA's traffic to its peer second non-AP STA. This embodiment is illustrated in FIG. 6. According to another embodiment, a first STA can send a TXOP request to the AP with which the first STA is associated for either uplink/downlink communication or for P2P traffic. According to this embodiment, the first STA can request for MU-RTS TXS Trigger frame corresponding to either mode-1 or mode-2.

FIG. 7 illustrates an example format 700 of a TXS request frame according to embodiments of the present disclosure. The embodiment of the example format 700 of a TXS request frame shown in FIG. 7 is for illustration only. Other embodiments of the example format 700 of a TXS request frame could be used without departing from the scope of this disclosure.

As illustrated in FIG. 7, according to one embodiment, the TXS request frame can be of control frame type. In FIG. 7, the definition of the frame control, duration, RA, TA, and FCS fields can be the same as that defined in clause 9 of reference [2].

FIG. 8 illustrates an example format 800 of a TXS request information field in a TXS request frame according to embodiments of the present disclosure. The embodiment of the example format 800 of a TXS request information field in a TXS request frame shown in FIG. 8 is for illustration only. Other embodiments of the example format 800 of a TXS request information field in a TXS request frame could be used without departing from the scope of this disclosure.

According to one embodiment, the medium time field 802 specifies the medium time requested by the TXS request frame. It can be in units of 256 us. Medium time can be the average time needed per each second for transmitting the P2P traffic. A STA can request for this medium time based on how many P2P packets it has in its queues. If a small number of P2P packets are in the queue, the requested medium time can be short; if a large number of P2P packets are in the queue, the requested medium time can be longer.

According to one embodiment, the bandwidth subfield 804 represents the maximum bandwidth the TXOP requesting STA can operate on the P2P link. This field can be encoded for different bandwidth representation, for example, 0 may represent 20 MHz bandwidth, 1 may represent 40 MHz bandwidth, 2 may represent 80 MHz bandwidth, 3 may represent 160 MHz bandwidth, 4 may represent 320 MHZ bandwidth, and so on.

FIG. 9 illustrates an example format 900 of a TXS request information field in a TXS request frame according to embodiments of the present disclosure. The embodiment of the example format 900 of a TXS request information field in a TXS request frame shown in FIG. 9 is for illustration only. Other embodiments of the example format 900 of a TXS request information field in a TXS request frame could be used without departing from the scope of this disclosure.

As illustrated in FIG. 9, the TID subfield 902 can specify the TID for which the TXOP is requested using the TXS request frame. According to another embodiment, a TID Bitmap can also be used to indicate multiple TIDs.

FIG. 10 illustrates an example format 1000 of a TXS request information field in a TXS request frame according to embodiments of the present disclosure. The embodiment of the example format 1000 of a TXS request information field in a TXS request frame shown in FIG. 10 is for illustration only. Other embodiments of the example format 1000 of a TXS request information field in a TXS request frame could be used without departing from the scope of this disclosure.

As illustrated in FIG. 10, in another possible variation, a mode subfield can also be included in the TXS request information field in the TXS request frame.

In FIG. 10, setting the Mode subfield to 0 may indicate that the TXOP has been requested for UL/DL (i.e., MU-RTS TXS Trigger frame—Mode-1); otherwise, the TXOP is requested for either UL/DL or P2P (i.e., MU-RTS TXS Trigger frame—Mode-2).

Figure 11:
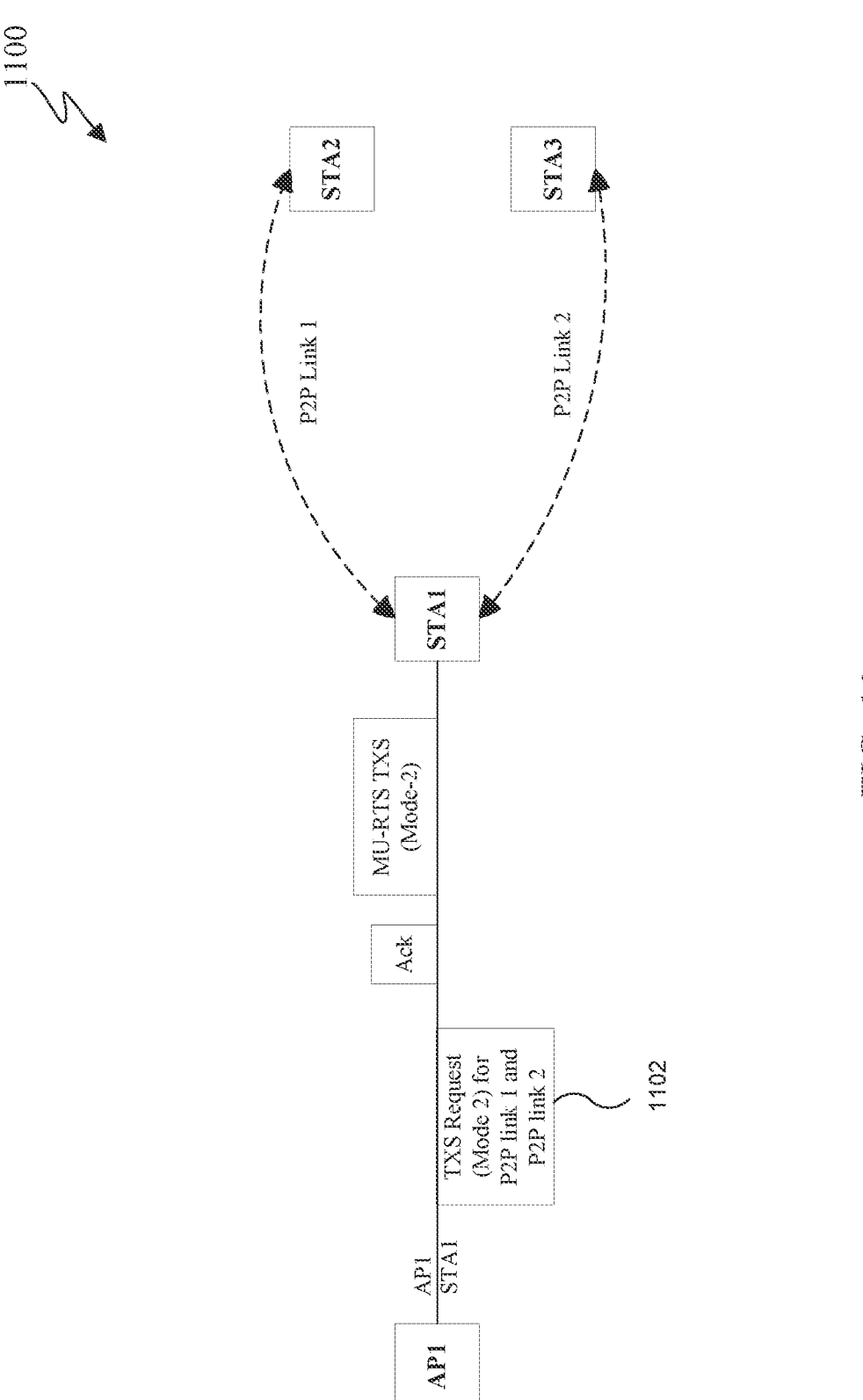
FIG. 11 illustrates an example of requesting TXOP for multiple P2P links according to embodiments of the present disclosure.

FIG. 11 illustrates an example 1100 of requesting TXOP for multiple P2P links according to embodiments of the present disclosure. The embodiment of the example 1100 of requesting TXOP for multiple P2P links shown in FIG. 10 is for illustration only. Other embodiments of the example 1100 of requesting TXOP for multiple P2P links could be used without departing from the scope of this disclosure.

In different scenarios, a non-AP STA can have multiple P2P links with multiple peer non-AP STAs. For each of the P2P links, the non-AP STA can have different transmission requirement. According to one embodiment, if a first non-AP STA has multiple P2P links established with multiple peer non-AP STAs, then the first non-AP STA can send a TXS Request frame 1102 to the AP requesting TXOPs for enabling transmission over each of the P2P link.

According to one embodiment, the same TXS request frame can be used to request for TXOP for multiple P2P links. In order to facilitate this, a possible format of the TXS request information field is shown in FIG. 12.

FIG. 12 illustrates an example format 1200 of a TXS request information field in a TXS request frame according to embodiments of the present disclosure. The embodiment of the example format 1200 of a TXS request information field in a TXS request frame shown in FIG. 12 is for illustration only. Other embodiments of the example format 1200 of a TXS request information field in a TXS request frame could be used without departing from the scope of this disclosure.

As illustrated in FIG. 12, the Number of P2P link information sets subfield 1202 indicates the number of P2P link information sets present in the P2P link information sets subfield (i.e., the last subfield shown in FIG. 12).

FIG. 13 illustrates an example format 1300 of a P2P link information subfield in a P2P link information sets subfield according to embodiments of the present disclosure. The embodiment of the example format 1300 of a P2P link information subfield in a P2P link information sets subfield shown in FIG. 13 is for illustration only. Other embodiments of the example format 1300 of a P2P link information subfield in a P2P link information sets subfield could be used without departing from the scope of this disclosure.

As illustrated in FIG. 13, the P2P link information sets subfields contains one or more P2P link information subfields (one P2P link information subfield for each P2P link for which TXOP is requested). The format of each P2P link information subfield in the P2P Link information sets field is shown in FIG. 13.

The medium time, bandwidth, TID subfields in FIG. 13 have the same description as described in a previous embodiment. The link ID subfield in the P2P link information subfield specifies the link ID of the P2P link for which the TXOP is requested. According to another embodiment, the MAC address of the peer STA operating at the other end of the P2P link can also be incorporated in the P2P link information subfield.

FIG. 14 illustrates an example format 1400 of a TXS request information field in a TXS request frame according to embodiments of the present disclosure. The embodiment of the example format 1400 of a TXS request information field in a TXS request frame shown in FIG. 14 is for illustration only. Other embodiments of the example format 1400 of a TXS request information field in a TXS request frame could be used without departing from the scope of this disclosure.

As illustrated in FIG. 14, according to another embodiment, a P2P link information bitmap 1402 can be used to indicate for which P2P link the corresponding P2P link information is included in the TXS request frame. According to this embodiment, a possible format of the TXS request information field in the TXS request frame is shown in FIG. 14.

In FIG. 14, the P2P link information bitmap subfield specifies a bitmap indicating for which P2P link the corresponding P2P link information subfield is present in the P2P link information sets subfield. For example, if the P2P link information bitmap is set to 0 0 1 0 1 0 0 0 0 0 0 0 0 0 0 0, then this may mean that the first P2P link information subfield in the P2P link information sets field 1404 corresponds to P2P link 3 or P2P link established on link 3 between an AP MLD and a non-AP MLD; the second P2P link information subfield in the P2P link information sets field corresponds to P2P link 5 or P2P link established on link 5 between an AP MLD and a non-AP MLD. The link numbering can be with respect to the AP MLD's links.

Figure 15:
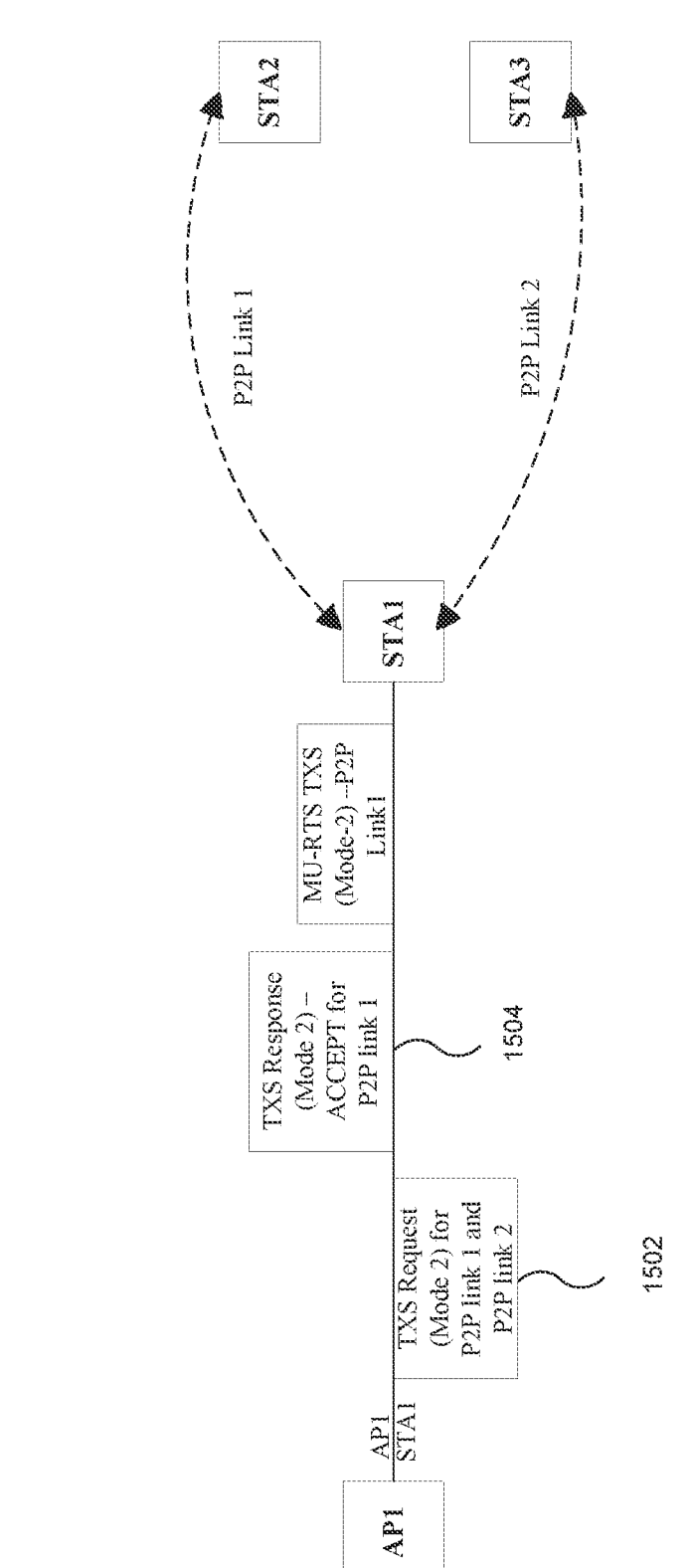
FIG. 15 illustrates an example of TXS request-response frame exchange according to embodiments of the present disclosure.

FIG. 15 illustrates an example 1500 of TXS request-response frame exchange according to embodiments of the present disclosure. The embodiment of the example 1500 of TXS request-response frame exchange shown in FIG. 15 is for illustration only. Other embodiments of the example 1500 of TXS request-response frame exchange could be used without departing from the scope of this disclosure.

As illustrated in FIG. 15, according to another embodiment, upon reception of a TXS request frame 1502 from a non-AP STA, the AP can send a TXS response frame 1504 to the non-AP STA. The TXS response frame can indicate whether or not the AP has accepted the request for TXOP made through the TXS request frame by the non-AP STA.

According to another embodiment, the TXS request frame can also be a variant of A-Control subfields. Such control subfield can be termed as TXOP sharing request (TXSR) control subfield. The format of the control information subfield of the TXSR control subfield can be similar to the TXS request information subfields as described in the previous embodiments. The control ID subfield corresponding to the TXSR control subfield can be any value between 10 and 14.

According to another embodiment, the TXS request frame can also be a management frame. The format can be similar to the ones described in previous embodiments.

Figure 16:
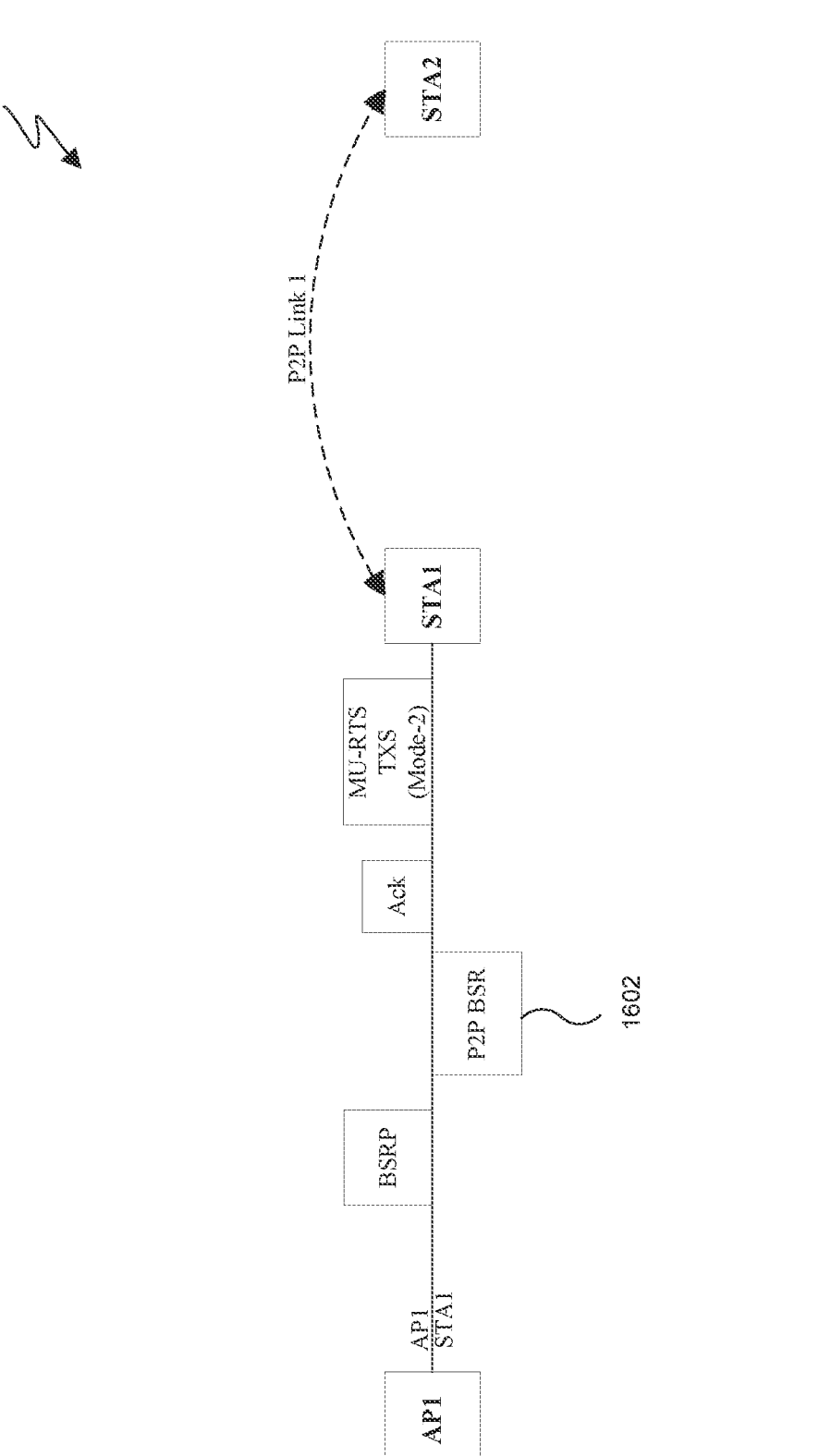
FIG. 16 illustrates an example of an implicit request for TXOP for P2P using a P2P buffer status report (BSR) frame according to embodiments of the present disclosure.

FIG. 16 illustrates an example 1600 of an implicit request for TXOP for P2P using a P2P buffer status report (BSR) frame according to embodiments of the present disclosure. The embodiment of the example 1600 of an implicit request for TXOP for P2P using a P2P buffer status report (BSR) frame shown in FIG. 16 is for illustration only. Other embodiments of the example 1600 of an implicit request for TXOP for P2P using a P2P buffer status report (BSR) frame could be used without departing from the scope of this disclosure.

According to another embodiment, a first non-AP STA that has established a peer-to-peer (P2P) link with a second peer non-AP STA can send a P2P-specific buffer status report (P2P BSR) frame 1602 to the AP (e.g., in response to a buffer status report poll (BSRP) trigger frame sent by the AP to the non-AP STA). This P2P BSR frame can be an implicit request by the non-AP STA to the AP for TXOP in order to enable the transmission of the P2P traffic as indicated by the buffer status in the P2P BSR. Upon reception of the P2P BSR from a non-AP STA, the AP can calculate the medium time needed in the TXOP so that the non-AP STA can finish transmission of the P2P packets in its buffers. The AP can calculate the medium time based on the queue size corresponding to different associated STAs and based on the AP's scheduling algorithm. Accordingly, the AP can allocate the calculated TXOP to the soliciting non-AP STA. The P2P BSR frame can also be transmitted as a response to a buffer status report poll (BSRP) sent by the AP. This embodiment is illustrated in FIG. 16.

Figure 17:
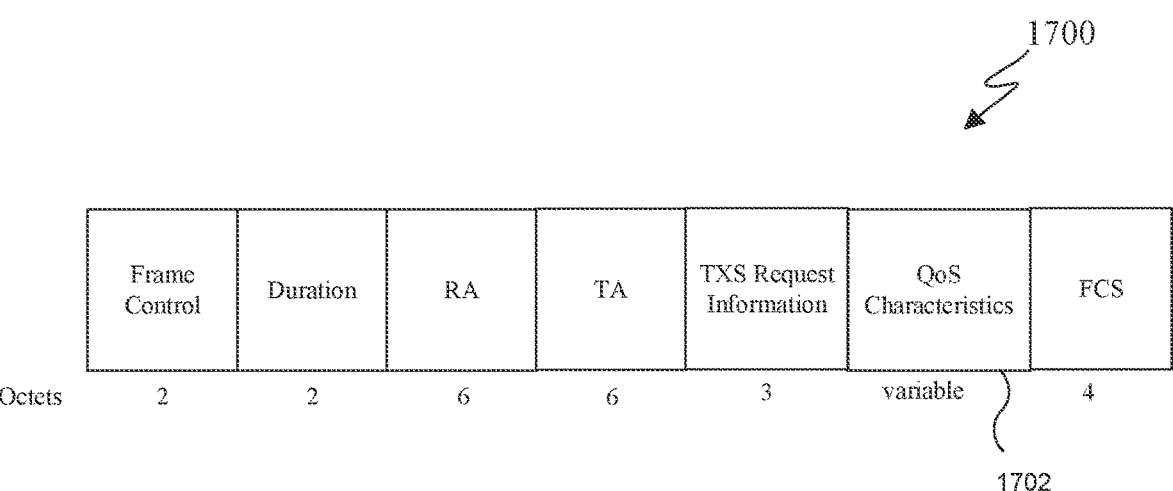
FIG. 17 illustrates an example format of a TXS request frame including a QoS characteristic element according to embodiments of the present disclosure.

FIG. 17 illustrates an example format 1700 of a TXS request frame including a QoS characteristic element according to embodiments of the present disclosure. The embodiment of the example format 1700 of a TXS request frame including a QoS characteristic element shown in FIG. 17 is for illustration only. Other embodiments of the example format 1700 of a TXS request frame including a QoS characteristic element could be used without departing from the scope of this disclosure.

According to one embodiment, a QoS Characteristics element 1702 can be included in a TXS Request frame. A TXS Request frame format that includes the QoS Characteristics element is shown in FIG. 17. According to another embodiment, a QoS Characteristics element can be sent either before or after sending the TXS Request frame or TXSR Control subfield or the P2P BSR to the AP.

In FIG. 17, the QoS Characteristics subfield contains one or more QoS Characteristics element. The format of the QoS Characteristics element is defined in reference [1].

Figure 18:
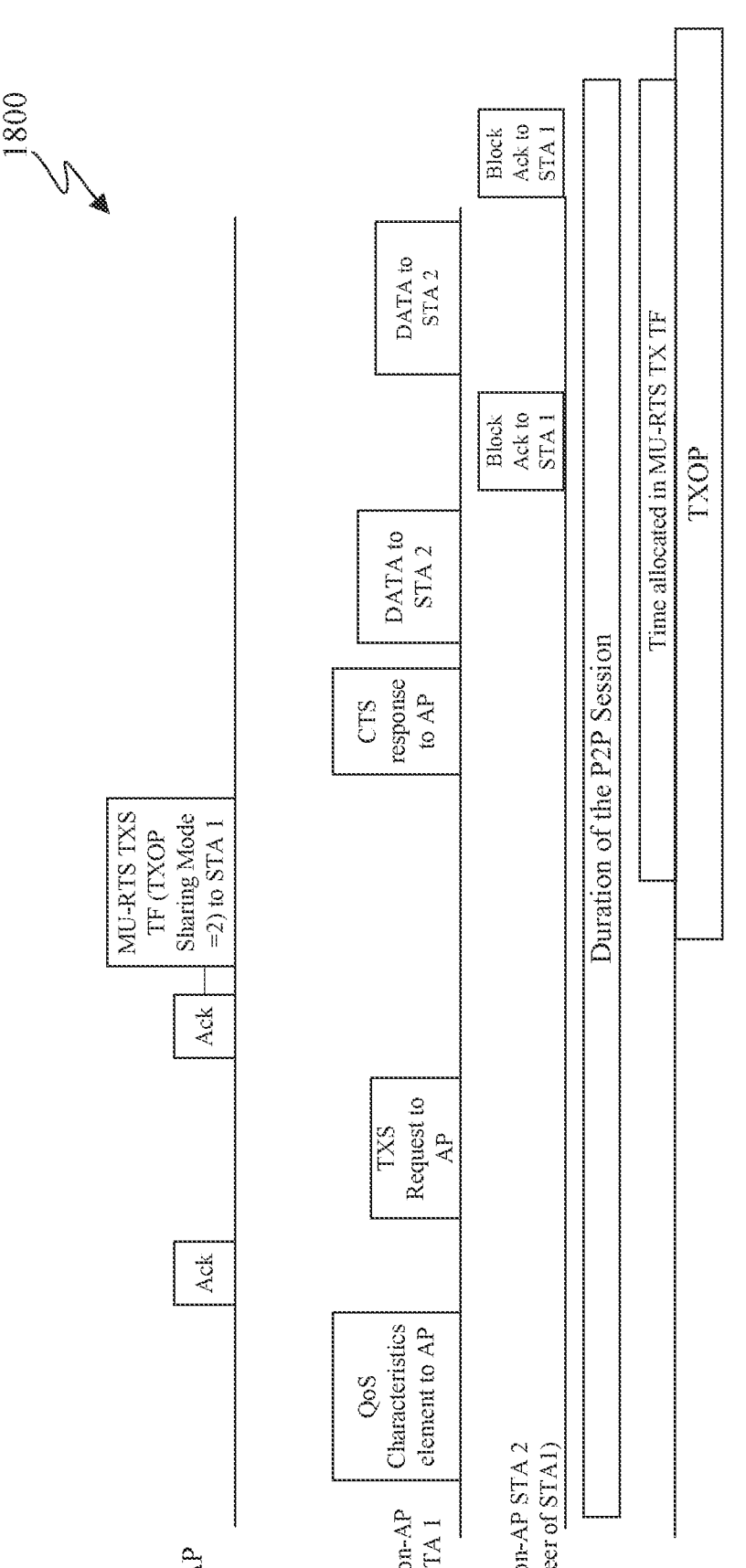
FIG. 18 illustrates an example of using a QoS characteristic element with a TXS request frame according to embodiments of the present disclosure.

FIG. 18 illustrates an example 1800 of using a QoS characteristic element with a TXS request frame according to embodiments of the present disclosure. The embodiment of the example 1800 of using a QoS characteristic element with a TXS request frame shown in FIG. 18 is for illustration only. Other embodiments of the example 1800 of using a QoS characteristic element with a TXS request frame could be used without departing from the scope of this disclosure.

The QoS characteristics element would provide to the AP the QoS requirements for each of the TIDs for which the TXOP has been requested by a non-AP STA. A QoS characteristic element would provide the relatively long-term QoS requirement information for the AP or AP MLD and may set the context for each of the TIDs. These values in the QoS characteristics element can be based on the P2P traffic pattern for the non-AP STA. For example, the delay bound subfield in the QoS characteristics element can be set based on the delay bound requirement of the traffic pattern of the STA. The subsequently transmitted TXS request frame or TXSR control subfield or the P2P BSR may indicate the TXOP requirement by the non-AP STA so that the non-AP STA can successfully complete its P2P transmission. A non-AP STA can send the QoS characteristics element once, and subsequently send multiple TXS Request frame or TXSR control subfield or the P2P BSR frame to the AP to solicit TXOP for its P2P transmission. A non-AP STA can also use the QoS characteristics element as an implicit request for TXOP for its P2P transmission, and can indicate the necessary medium time and bandwidth corresponding to the requested TXOP. However, a QoS characteristics element contains only an average value needed for the P2P traffic. These values can be set based on long-term P2P traffic pattern. However, in real-time operation, a non-AP STA can also transmit some of the traffic using EDCA contention method for which the TXOP has been requested in the QoS characteristics element, and hence, if the AP allocates the TXOP to the non-AP STA based on the originally requested TXOP in the QoS characteristics element, then the AP would be over allocating the TXOP for the non-AP STA's P2P traffic. On the other hand, the AP can also be under-allocating TXOP to the non-AP STA if the AP allocates based on the TXOP requested in the QoS characteristics element. Hence, in order to dynamically request the TXOP, the non-AP STA can use the TXS request frame or TXSR control frame or P2P BSR. An illustration of the use of QoS Characteristics element with the TXS Request frame is shown in FIG. 18.

FIG. 19 illustrates a flowchart of a method 1900 of using a TXS request procedure according to embodiments of the present disclosure. The embodiment of the flowchart of a method 1900 of using a TXS request procedure shown in FIG. 19 is for illustration only. Other embodiments of the flowchart of a method 1900 of using a TXS request procedure could be used without departing from the scope of this disclosure.

As illustrated in FIG. 19, the method 1900 begins at step 1902, where a non-AP STA sends a TXS request to the AP for uplink communication. At step 1904, the non-AP STA sends the QoS requirement, e.g., through the QoS characteristics element, to the AP corresponding to the TXS request. At step 1906, the non-AP STA receives a response for the TXS request from the AP. At step 1908, a determination is made whether the non-AP STA receives an acceptance response for its TXS request from the AP. If not, then at step 1910, the non-AP STA does not receive the TXS trigger frame from the AP. If yes, then at step 1912, the non-AP STA receives the TXS trigger frame from the AP.

Figure 20:
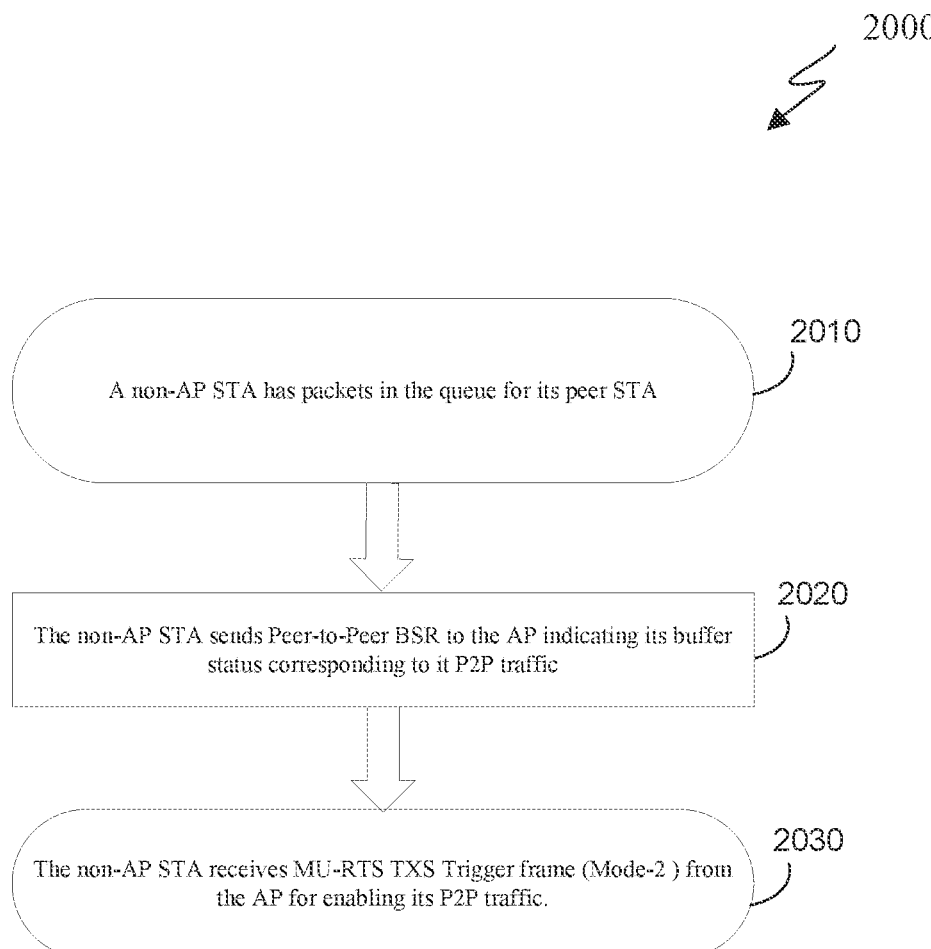
FIG. 20 illustrates a flowchart of a method of using a P2P specific BSR for soliciting TXOP according to embodiments of the present disclosure.

FIG. 20 illustrates a flowchart of a method 2000 of using a P2P specific BSR for soliciting TXOP according to embodiments of the present disclosure. The embodiment of the flowchart of a method 2000 of using a P2P specific BSR for soliciting TXOP shown in FIG. 20 is for illustration only. Other embodiments of the flowchart of a method 2000 of using a P2P specific BSR for soliciting TXOP could be used without departing from the scope of this disclosure.

As illustrated in FIG. 20, the method 2000 begins at step 2002, where a non-AP STA has packets in the queue for its peer STA. At step 2004, the non-AP STA sends peer-to-peer BSR to the AP indicating its buffer status corresponding to its P2P traffic. At step 2006, the non-AP STA receives an MU-RTS TXS trigger frame (mode-2) from the AP for enabling its P2P traffic.

Figure 21:
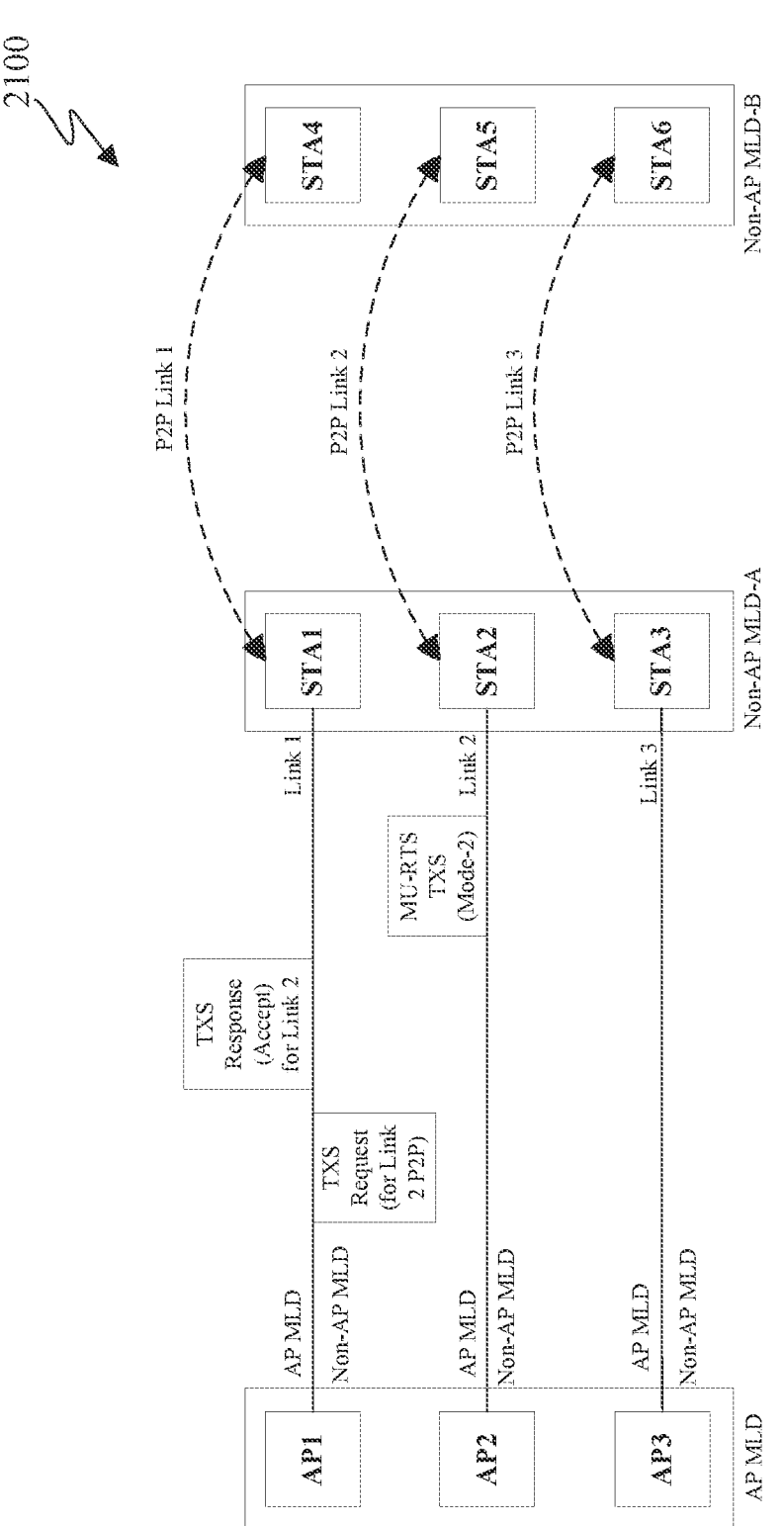
FIG. 21 illustrates an example of sending a TXS request on one link for another link's P2P traffic according to embodiments of the present disclosure.

FIG. 21 illustrates an example 2100 of sending a TXS request on one link for another link's P2P traffic according to embodiments of the present disclosure. The embodiment of the example 2100 of sending a TXS request on one link for another link's P2P traffic shown in FIG. 21 is for illustration only. Other embodiments of the example 2100 of sending a TXS request on one link for another link's P2P traffic could be used without departing from the scope of this disclosure.

According to one embodiment, a non-AP MLD that has established one or multiple P2P links over one or multiple links, can send the TXS request frame to the AP MLD to solicit TXOP for the P2P links. The TXS request frame can be sent over one link in order to request for TXOP over other link(s). This is illustrated in FIG. 21.

Figure 22:
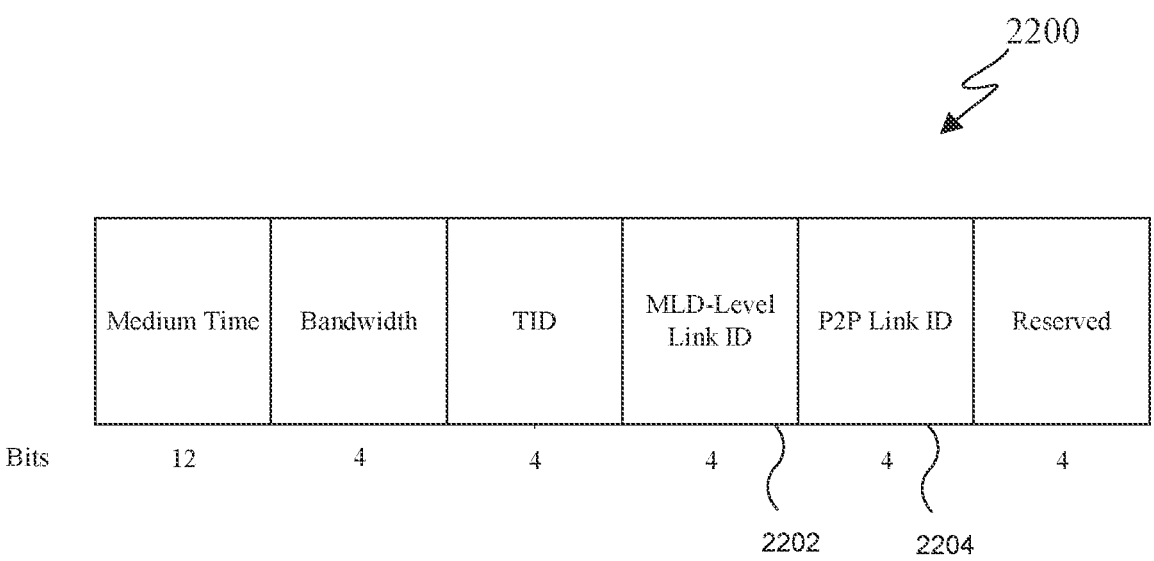
FIG. 22 illustrates an example format of a P2P link information subfield in a P2P link information sets subfield according to embodiments of the present disclosure.

According to one embodiment, a non-AP MLD that has established one or multiple P2P links over one or multiple links, can send the TXS request frame to the AP MLD indicating in the request frame information such as—on which link between the AP MLD the non-AP MLD needs the TXOP and for which P2P link the non-AP MLD needs the TXOP for. To enable this, an MLD-Level Link ID can be included in the P2P link information subfield along with the P2P Link ID. FIG. 22 illustrates this variation of the P2P link information subfield.

FIG. 22 illustrates an example format 2200 of a P2P link information subfield in a P2P link information sets subfield according to embodiments of the present disclosure. The embodiment of the example format 2200 of a P2P link information subfield in a P2P link information sets subfield shown in FIG. 22 is for illustration only. Other embodiments of the example format 2200 of a P2P link information subfield in a P2P link information sets subfield could be used without departing from the scope of this disclosure.

In FIG. 22, the MLD-Level Link ID subfield 2202 would identify the Link ID of the link on which a P2P peer STA affiliated with the non-AP MLD is operating and that needs the TXOP for P2P communication. The P2P Link ID subfield 2204 would identify the P2P Link for which the STA affiliated with the non-AP MLD and operating on the link specified in the MLD-Level Link ID subfield would need to TXOP requested from the AP MLD.

According to another embodiment, in FIG. 22, a P2P MAC address could also be included in the P2P link information subfield. The P2P MAC address subfield would specify the MAC address of the peer STA operating on the other end of the P2P link for which the non-AP MLD requesting the TXOP from the AP MLD for communication over that P2P link.

As an example, for this embodiment, in reference to FIG. 21, the MLD-Level Link ID subfield would identify the 'Link 2' on which STA-2 is operating on. The P2P Link ID subfield or P2P MAC address subfield would then identify 'P2P Link 2' in FIG. 21. Note that although FIG. 21 shows STA2 has only one P2P link, in practice, STA2 may have more than one P2P links, and in those scenarios, P2P Link ID subfield or P2P MAC Address subfield would be needed to identify the P2P link for which STA2 is requesting the TXOP.

According to one embodiment, a non-AP MLD that has established one or multiple P2P links over one or multiple links, can send the P2P specific BSR frame to the AP MLD to implicitly solicit TXOP for the P2P links. The P2P BSR frame can be sent over one link in order to request for TXOP over other link(s). This is illustrated in FIG. 23.

Figure 23:
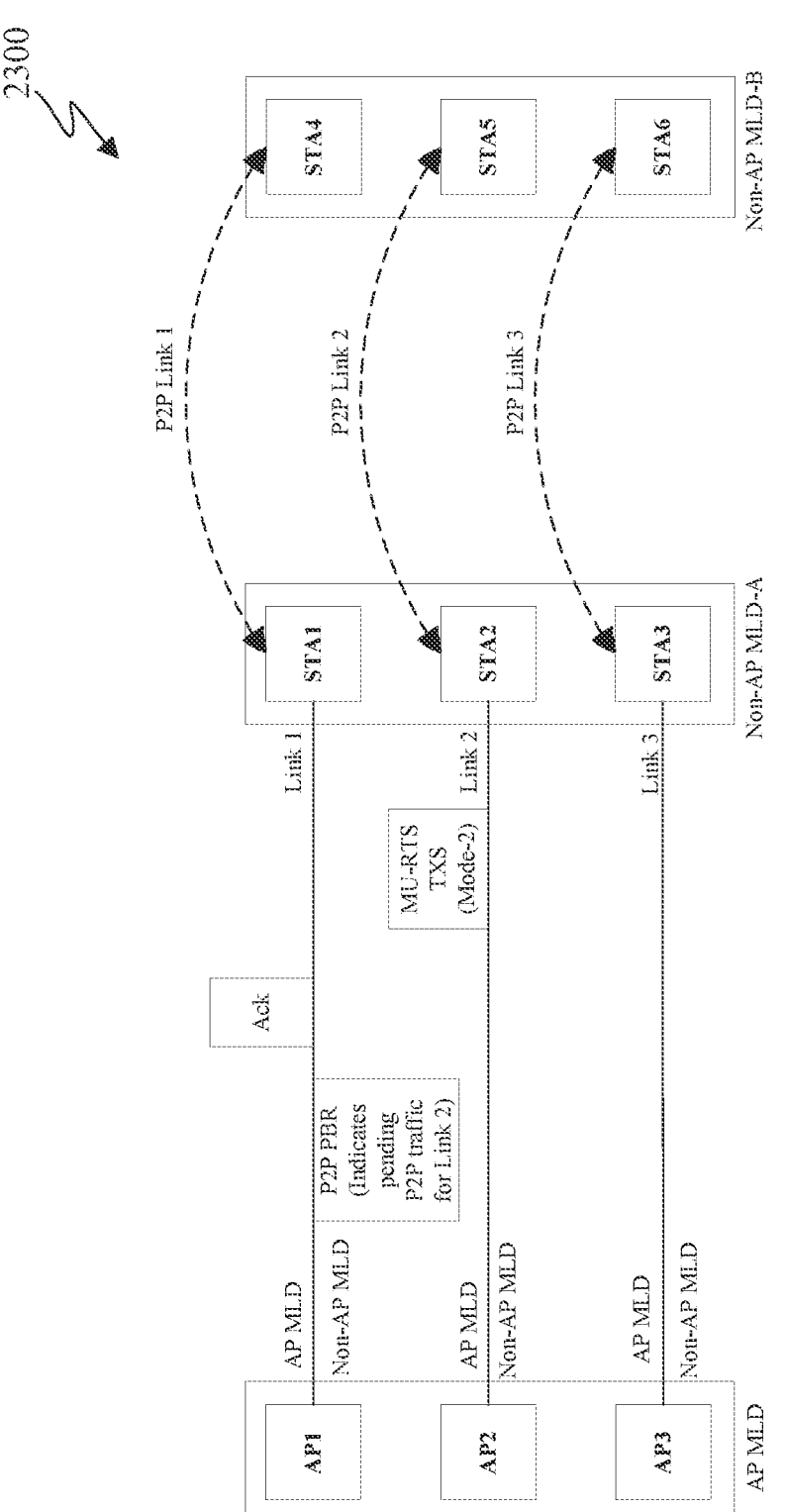
FIG. 23 illustrates an example of sending P2P BSR on one link for another link's P2P traffic according to embodiments of the present disclosure.

FIG. 23 illustrates an example 2300 of sending P2P BSR on one link for another link's P2P traffic according to embodiments of the present disclosure. The embodiment of the example 2300 of sending P2P BSR on one link for another link's P2P traffic shown in FIG. 23 is for illustration only. Other embodiments of the example 2300 of sending P2P BSR on one link for another link's P2P traffic could be used without departing from the scope of this disclosure.

According to one embodiment, an MLD-Level Link ID subfield can be included in the QoS characteristics element in order to indicate for which link of the AP MLD the QoS characteristics element information corresponds. The usage of the MLD-Level Link ID subfield in conjunction with P2P Link ID subfield in the QoS characteristics element can be similar to the embodiments corresponding to FIG. 21 and FIG. 22.

According to one embodiment, a non-AP MLD or a non-AP STA can use the More Data subfield in the Ack or BlockAck frame to the associated AP to have a similar purpose as the TXS request frame as described in previous embodiments in this disclosure. For example, if a non-AP STA or a STA affiliated with a non-AP MLD solicits TXOP from its associated AP, then the non-AP MLD can include a More Data subfield in the Ack or BlockAck frame it transmits to the Associated AP. Upon reception of the More Data subfield included in an Ack or BlockAck frame from the STA, the associated AP can trigger the non-AP STA for uplink transmission, can send to the STA a MU-RTS TXS trigger frame with TXOP sharing mode set to 2 or 1. In other words, the More Data subfield in the Ack or BlockAck may act as in indication to the AP that the non-AP STA has packets in its buffer that needs to be transmitted.

According to one embodiment, in reference to other embodiments described herein, a STA affiliated with the non-AP MLD can send the More Data subfield to the associated AP MLD over a first link between the AP MLD and the non-AP MLD, where the More Data subfield can indicate that the TXOP is requested by the non-AP MLD for data transmission on a second link between the same AP MLD and the non-AP MLD.

According to one embodiment, a non-AP STA or a STA affiliated with a non-AP MLD can send a More Data subfield in the Ack or BlockAck frame to the associated AP or AP MLD if the AP MLD has latency-sensitive packets in its buffer. Including a More Data subfield in the Ack or Block-Ack frame can be an indication that the transmitting STA or non-AP MLD has latency-sensitive traffic in its buffer, and may be an indication that the non-AP STA or the non-AP MLD requests for TXOP (e.g., an MU-RTS TXS trigger frame with TXOP sharing mode set to 2 or 1). According to one embodiment, a non-AP STA may not include a More Data subfield in the Ack or BlockAck frame to request for TXOP or to request for trigger frame from the AP for the uplink transmission of the non-AP STA if the STA doesn't have any packets in its buffer or if the STA has packets in the buffer that are not latency-sensitive.

FIG. 24 illustrates a flowchart of a method 2400 for wireless communication performed by a non-AP device that comprises a first non-AP STA according to embodiments of the present disclosure. The embodiment of the method 2400 for wireless communication performed by a non-AP MLD shown in FIG. 24 is for illustration only. Other embodiments of the method 2400 for wireless communication performed by a non-AP MLD could be used without departing from the scope of this disclosure.

As illustrated in FIG. 24, the method 2400 begins at step 2402, where a link with a first AP is formed. At step 2404, a first peer-to-peer (P2P) link with a second non-AP STA is formed. At step 2406, a request associated with a transmit opportunity (TXOP) is transmitted to the AP. At step 2408, information associated with the TXOP is received from the AP. At step 2410, a determination is made whether the received information associated with the TXOP can be used only for uplink communication or for both uplink communication and P2P communication.

In one embodiment, the request comprises a TXOP sharing (TXS) request for requesting a multiuser request to send (MU-RTS) trigger frame associated with transmission of first STA traffic to the second non-AP STA.

In one embodiment, the TXS request comprises a control frame type.

In one embodiment, the first non-AP STA forms a second P2P link with a third non-AP STA, and the request associated with the TXOP requests TXOPs for enabling communication over the first P2P link and the second P2P link.

In one embodiment, the request associated with the TXOP comprises a P2P buffer status report (BSR) frame, the P2P BSR frame including a buffer status indicating P2P traffic.

In one embodiment, the request associated with the TXOP includes a quality of service (QoS) characteristics element.

In one embodiment, the non-AP device is a first non-AP multi-link device (MLD), the first STA is one of a first plurality of STAs in the first non-AP MLD, the second STA is one of a second plurality of STAs in a second non-AP MLD, and the AP is one of a plurality of APs in an AP MLD, wherein the first STAs: form links with corresponding APs of the AP MLD, form peer-to-peer (P2P) links with corresponding second STAs of the second non-AP MLD, transmit a request associated with a transmit opportunity (TXOP) to the corresponding AP of the AP MLD, receive information associated with the TXOP from one of the APs of the AP MLD, and determine whether the received information associated with the TXOP can be used only for uplink communication or for both uplink communication and P2P communication.

The above flowcharts illustrate example methods that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) device comprising:
   a first station (STA) comprising a transceiver configured to:
   form a link with a first AP,
   form a first peer-to-peer (P2P) link with a second non-AP STA,
   transmit a request associated with a transmit opportunity (TXOP) to the AP, the request comprising a subfield that includes one from among an indication that the non-AP device requests for the TXOP to be used only for uplink communication and an alternative indication that the non-AP device requests for the TXOP to be used for both uplink communication and P2P communication, and
   receive information associated with the TXOP from the AP; and
   a processor operably coupled to the transceiver, the processor configured to determine whether the received information associated with the TXOP can be used only for uplink communication or for both uplink communication and P2P communication.

2. The non-AP device of claim 1, wherein the request comprises a TXOP sharing (TXS) request for requesting a multiuser request to send (MU-RTS) trigger frame associated with transmission of first STA traffic to the second non-AP STA.

3. The non-AP device of claim 2, wherein the TXS request comprises a control frame type.

4. The non-AP device of claim 1, wherein:
   the transceiver is further configured to form a second P2P link with a third non-AP STA, and
   the request associated with the TXOP requests TXOPs for enabling communication over the first P2P link and the second P2P link.

5. The non-AP device of claim 1, wherein the request associated with the TXOP comprises a P2P buffer status report (BSR) frame, the P2P BSR frame including a buffer status indicating P2P traffic.

6. The non-AP device of claim 1, wherein the request associated with the TXOP includes a quality of service (QoS) characteristics element.

7. The non-AP device of claim 1, wherein:
   the non-AP device is a first non-AP multi-link device (MLD), the first STA is one of a first plurality of STAs in the first non-AP MLD, the second non-AP STA is one of a second plurality of STAs in a second non-AP MLD, the AP is one of a plurality of APs in an AP MLD, each of the first plurality of STAs comprises a transceiver configured to:

form a link with a corresponding AP of the AP MLD, form a peer-to-peer (P2P) link with a corresponding second STA of the second non-AP MLD, transmit a request associated with a transmit opportunity (TXOP) to the corresponding AP of the AP MLD, and receive information associated with the TXOP from one of the APs of the AP MLD; and a processor operably coupled to the first plurality of STAs, the processor configured to determine whether the received information associated with the TXOP can be used only for uplink communication or for both uplink communication and P2P communication.

8. The non-AP device of claim 7, wherein:

the request comprises a TXOP sharing (TXS) request for requesting a multiuser request to send (MU-RTS) trigger frame associated with transmission of first STA traffic to the second STA.

9. The non-AP device of claim 7, wherein the request associated with the TXOP requests TXOPs for enabling communication over one or more P2P link.

10. The non-AP device of claim 7, wherein the request associated with the TXOP comprises a P2P buffer status report (BSR) frame, the P2P BSR frame including a buffer status indicating P2P traffic.

11. A method of wireless communication performed by a first non-access point (AP) multi-link device (MLD) that comprises a first station (STA), the method comprising:

forming a link with a first AP;

forming a first peer-to-peer (P2P) link with a second non-AP STA;

transmitting a request associated with a transmit opportunity (TXOP) to the AP, the request comprising a subfield that includes one from among an indication that the non-AP device requests for the TXOP to be used only for uplink communication and an alternative indication that the non-AP device requests for the TXOP to be used for both uplink communication and P2P communication;

receiving information associated with the TXOP from the AP; and determining whether the received information associated with the TXOP can be used only for uplink communication or for both uplink communication and P2P communication.

12. The method of claim 11, wherein the request comprises a TXOP sharing (TXS) request for requesting a multiuser request to send (MU-RTS) trigger frame associated with transmission of first STA traffic to the second non-AP STA.

13. The method of claim 12, wherein the TXS request comprises a control frame type.

14. The method of claim 11, further comprising forming a second P2P link with a third non-AP STA, wherein:

the request associated with the TXOP requests TXOPs for enabling communication over the first P2P link and the second P2P link.

15. The method of claim 11, wherein the request associated with the TXOP comprises a P2P buffer status report (BSR) frame, the P2P BSR frame including a buffer status indicating P2P traffic.

16. The method of claim 11, wherein the request associated with the TXOP includes a quality of service (QoS) characteristics element.

17. The method of claim 11, wherein:

the non-AP device is a first non-AP multi-link device (MLD), the first STA is one of a first plurality of STAs in the first non-AP MLD, the second STA is one of a second plurality of STAs in a second non-AP MLD, and the AP is one of a plurality of APs in an AP MLD, the method further comprising:

forming a link with a corresponding AP of the AP MLD, forming a peer-to-peer (P2P) link with a corresponding second STA of the second non-AP MLD, transmitting a request associated with a transmit opportunity (TXOP) to the corresponding AP of the AP MLD, receiving information associated with the TXOP from one of the APs of the AP MLD; and determining whether the received information associated with the TXOP can be used only for uplink communication or for both uplink communication and P2P communication.

18. The method of claim 17, wherein:

the request comprises a TXOP sharing (TXS) request for requesting a multiuser request to send (MU-RTS) trigger frame associated with transmission of first STA traffic to the second STA.

19. The method of claim 17, wherein the request associated with the TXOP requests TXOPs for enabling communication over one or more P2P link.

20. The method of claim 17, wherein the request associated with the TXOP comprises a P2P buffer status report (BSR) frame, the P2P BSR frame including a buffer status indicating P2P traffic.

* * * * *